United States Patent
Bortnik et al.

(10) Patent No.: US 7,354,345 B2
(45) Date of Patent: Apr. 8, 2008

(54) MULTILEVEL ONLINE TOURNAMENT

(75) Inventors: Michal Bortnik, Seattle, WA (US); Steven D. Lamb, Woodinville, WA (US); Max Hoberman, Redmond, WA (US); Johan P. Hansen, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 759 days.

(21) Appl. No.: 10/852,659

(22) Filed: May 25, 2004

(65) Prior Publication Data

US 2005/0278041 A1 Dec. 15, 2005

(51) Int. Cl.
*A63F 9/24* (2006.01)
(52) U.S. Cl. .............. 463/42; 463/2; 463/40
(58) Field of Classification Search ........... 463/7, 463/9, 29, 42
See application file for complete search history.

(56) References Cited

U.S. PATENT DOCUMENTS

| | | | |
|---|---|---|---|
| 5,359,510 A * | 10/1994 | Sabaliauskas | 700/91 |
| 5,779,549 A | 7/1998 | Walker et al. | |
| 6,224,486 B1 | 5/2001 | Walker et al. | |
| 6,425,828 B2 | 7/2002 | Walker et al. | |
| 6,485,019 B1 | 11/2002 | Braunlich et al. | |
| 6,588,752 B2 | 7/2003 | Mickowski | |
| 2002/0142842 A1 * | 10/2002 | Easley et al. | 463/42 |

OTHER PUBLICATIONS

Excerpts; Human Kinetics- Excerpts; http://www.humankinetics.com/products/showercerpt.cfm; pp. 3.

* cited by examiner

*Primary Examiner*—Xuan M. Thai
*Assistant Examiner*—Joshua P. Wert
(74) *Attorney, Agent, or Firm*—Banner & Witcoff, Ltd.

(57) ABSTRACT

A multilevel online tournament is provided. The first tournament round has a single bracket and each subsequent tournament round has a winners bracket and a losers bracket corresponding to a bracket in the previous tournament round. The tournament format allows players to match-up against any other player located within the same bracket. The online tournament format also allows participants to start playing match in a round of the tournament prior to the official start of that round. Thus, players are able to more quickly advance through the tournament and spend less time waiting for a suitable opponent. The tournament format also allows for players to request available tournament byes and to automatically progress when they are unable to connect with other players due to quality of service issues.

15 Claims, 18 Drawing Sheets

- Compute the number of rounds
  - Given the number of enrolled players (P), the number of Rounds (R) in the tournament is R=log$_2$ (Next Power of 2 greater than P)
- Create R rounds for the tournament
- Create Bracket(1,1), where Bracket(m,n) is the nth Bracket in Round m (see figure below). Bracket(1,1) is the only bracket in Round 1
- Create the appropriate number of Slots(1,1) in Bracket(1,1)
  - Given a number of enrolled players participating in Round 1 (P1), find
    S(1,1) = Next Power of 2 greater than P1
    E.g. If there are 10 players in Round 1, S(1,1) is 16
- Create Bracket(1,1) BYEs:
  (B1,1) = S(1,1) − P(1,1)
- For each of the remaining Rounds (Round 2 through Round m)
- Create Tournament Brackets for each Round:
  - For every Bracket in a non-final Round create two Brackets (Winners and Losers) in the following Round
  - Create the appropriate number of Slots in each bracket
    - Given S(m,n) of the parent bracket, the Winners bracket S(m+1, 2n-1) = S(m,n)/2 and the Losers bracket S(m+1, 2n) = S(m,n)/2
  - Create the appropriate number of BYEs in each bracket
- The total number of brackets in tournament is at most (2$^R$ − 1)

FIG. 8

MULTILEVEL ONLINE TOURNAMENT

BACKGROUND OF THE INVENTION

1. Field of the Invention

The present invention relates to games. More precisely, the present invention relates to systems and methods for conducting online tournaments for video games.

2. Description of Related Art

The concept of online gaming has evolved from mere concept to reality. Originally, implementations of online games were rudimentary at best. Two players located in remote locations would give each other their respective IP addresses and link up directly to play a game online. As available bandwidth increased and games became better suited for online play, online forums were created to help players find each other. These forums provided players the ability to find opponents that they otherwise would not have been easily able to find, allowing the competitive sphere to broaden substantially. Shortly thereafter, online gamers realized that it would be more enjoyable if some degree of organization were brought to finding and choosing opponents. As a result, online tournaments were born.

Early online tournaments were single elimination tournaments in which predefined pairings of opponents were matched against each other. The winner would advance to a next tournament round and the loser would be removed from the competition. In the single elimination format, winners continued playing against each other until a single player remained unbeaten in the tournament. That remaining player was crowned the tournament champion.

Nevertheless, single elimination tournaments had several shortcomings that hindered the experience of online tournament play. For example, in the single elimination format, match-ups were predetermined, and as winners advanced to the next round, they would be forced to wait for their opponent to finish a corresponding match. Thus, a player might sit idly for a lengthy period of time before playing his next round match. If the player became inpatient, he would often choose to drop out of the tournament rather than wait for an opponent to become available. Moreover, if a player was forced to wait before playing each round in a large tournament, the tournament would take hours and hours to complete with the player spending the majority of that time waiting rather than playing. Either scenario negatively affects user satisfaction levels.

Another shortcoming found in single elimination tournaments was the disparity in the number of matches played by competitors. Because each match eliminated one of the two match participants from the tournament, half of all tournament participants played only a single match. The top participants, in contrast, would advance deep into the brackets playing several matches. The lesser players would have the opportunity to play only a single match in which they could hone their skills. Thus, the better players were able to practice more, resulting in a scenario where the better players improved and the lesser players stagnated.

In order to alleviate some of these shortcomings, online tournaments began using a format known as the "Swiss Round Robin" format (sometimes called the "Swiss Ladder" format, or simply the "Swiss format"). This format, developed initially to help run chess tournament play, attempted to address the problem of disparities among players in terms of the number of matches played. In the Swiss tournament format, all players were seeded and played a first round match. The winner of each first round match was placed in a second round winners bracket and each of the losers was placed in the second round losers bracket. Once all of the matches in the first round had been completed, the winners bracket was re-seeded and the losers bracket was re-seeded, and the second round of play began.

Upon completion of the second round, the winners in each bracket were divided from the losers, resulting in a total of four brackets. The competitors in each bracket were again re-seeded and the third round commenced. The process continued until only a single undefeated player remained in the tournament. Although the Swiss tournament format allowed less skilled players to continue playing matches in spite of several losses, it did not provide a solution to the problem of waiting for all matches of a round to finish prior to commencement of the next tournament round.

A number of other problems have been encountered in conducting online tournaments. For example, current methods of conducting online tournaments are ill-equipped to handle uneven numbers of competitors. This situation arises when competitors drop out of tournaments, causing the brackets to become uneven. Moreover, online tournaments have historically suffered from network address translation (NAT) and quality of service (QoS) issues that prevent certain players from being able to connect effectively to play against each other.

In view of these and other shortcomings in the prior art, what is needed is an online tournament system and method that reduce the waiting time between matches for players and allow players to continue playing after a loss. What is further needed is an online tournament that effectively handles NAT/QoS issues that adversely affect the ability of players to connect with each other for a match.

BRIEF SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

According to aspects of the invention, a multilevel online tournament is provided in which a tournament participant need not wait until the current tournament round completes before starting the next tournament round match. Additional aspects of the invention provide for an online tournament format such that multiple rounds simultaneously take place.

Another aspect of the invention provides a method for conducting an online tournament in which participants are permitted to match up with any other participant in the same bracket. Winners advance to a next tournament round winners bracket, and losers advance to a next tournament round losers bracket. Matches in the next tournament round may immediately commence, regardless of whether the matches in the previous round have completed.

According to another aspect of the invention, a method is provided for advancing participants into a next tournament bracket when a suitable opponent cannot be found in the current round. The system calculates a trust rating for the requester that determines whether they are advanced to the winners bracket or the losers bracket of the next tournament round.

According to yet another aspect of the invention, a computer or bank of computers can implement a method for administering a game tournament over a computer network for many participants. The computer initially places all of the participants in a single first round bracket, and pairs off participants for tournament matches, each of which result in a winner and a loser. For each match-up, the computer places the winner into a next tournament round winners bracket corresponding to the bracket for the current round in which the match-up occurred, and places the loser into a next tournament round losers bracket corresponding to the bracket for the current round in which the match-up occurred. In subsequent rounds, the computer pairs off the participants in each bracket of a current tournament round for game match-ups, where any two participants in the same bracket of the tournament round are allowed to match-up.

BRIEF DESCRIPTION OF THE DRAWINGS

The present invention is illustrated by way of example and not limited in the accompanying figures in which like reference numerals indicate similar elements and in which:

FIG. 8 illustrates a diagram representing the scheduling routine according to aspects of the invention.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Figure 1:
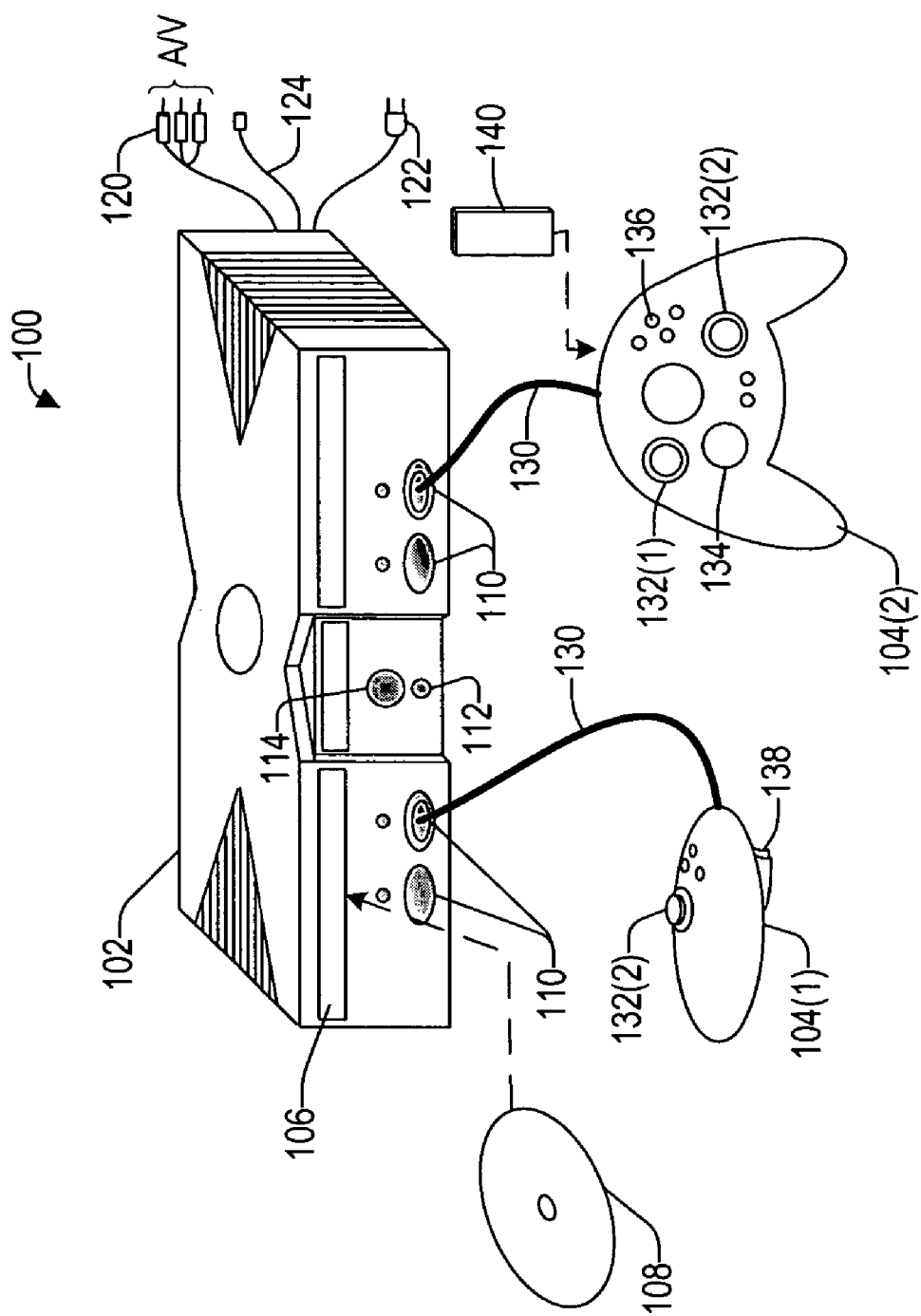
FIG. 1 illustrates a gaming system that may be used according to an illustrative embodiment of the invention.

FIG. 1 illustrates an example of a suitable gaming system environment 100 on which computer games, video games, and or other electronic games (collectively referred to herein as computer games) may be played. The gaming system environment 100 is only one example of a suitable computing environment and is not intended to suggest any limitation as to the scope of use or functionality of the invention. Neither should the gaming system environment 100 be interpreted as having any dependency or requirement relating to any one or combination of components illustrated in the illustrative operating gaming system environment 100.

The invention is operational with numerous other general purpose or special purpose computing system environments or configurations. Examples of well known computing systems, environments, and/or configurations that may be suitable for use with the invention include, but are not limited to, personal computers; server computers; portable and hand-held devices such as personal digital assistants (PDAs), tablet PCs or laptop PCs; multiprocessor systems; microprocessor-based systems; set top boxes; programmable consumer electronics; network PCs; minicomputers; mainframe computers; electronic game consoles, distributed computing environments that include any of the above systems or devices; and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

FIG. 1 shows an exemplary gaming system 100. Gaming system 100 may include a game console 102 and up to four controllers, as represented by controllers 104(1) and 104(2). The game console 102 is equipped with an internal hard disk drive and a portable media drive 106 that supports various forms of portable storage media as represented by optical storage disc 108. Examples of suitable portable storage media include DVD, CD-ROM, game discs, and so forth.

Game console 102 has four slots 110 on its front face to support up to four controllers, although the number and arrangement of slots may be modified. A power button 112 and an eject button 114 are also positioned on the front face of the game console 102. The power button 112 switches power to the game console and the eject button 114 alternately opens and closes a tray of the portable media drive 106 to allow insertion and extraction of the storage disc 108.

Game console 102 may connect to a television or other display (not shown) via A/V interfacing cables 120. A power cable 122 provides power to the game console. Game console 102 may further be configured with broadband network capabilities, as represented by the cable or modem connector 124 to facilitate access to a network, such as the Internet.

Each controller 104 may be coupled to the game console 102 via a wire or wireless interface. In the illustrated implementation, the controllers are USB (Universal Serial Bus) compatible and are connected to the console 102 via serial cables 130. Controller 102 may be equipped with any of a wide variety of user interaction mechanisms. As illustrated in FIG. 1, each controller 104 is equipped with two thumbsticks 132(1) and 132(2), a D-pad 134, buttons 136, and two triggers 138. These mechanisms are merely representative, and other known gaming mechanisms may be substituted for or added to those shown in FIG. 1.

A memory unit (MU) 140 may be inserted into the controller 104 to provide additional and portable storage. Portable memory units enable users to store game parameters and port them for play on other consoles. In the described implementation, each controller is configured to accommodate two memory units 140, although more or less than two units may be employed in other implementations.

Gaming system 100 is capable of playing, for example, games, music, and videos. With the different storage offerings, titles can be played from the hard disk drive or the portable medium 108 in drive 106, from an online source, or from a memory unit 140. A sample of what gaming system 100 is capable of playing include game titles played from CD and DVD discs, from the hard disk drive, or from an online source; digital music played from a CD in the portable media drive 106, from a file on the hard disk drive (e.g., Windows Media Audio (WMA) format), or from online streaming sources; and digital audio/video played from a DVD disc in the portable media drive 106, from a file on the hard disk drive (e.g., Active Streaming Format), or from online streaming sources.

Figure 2:
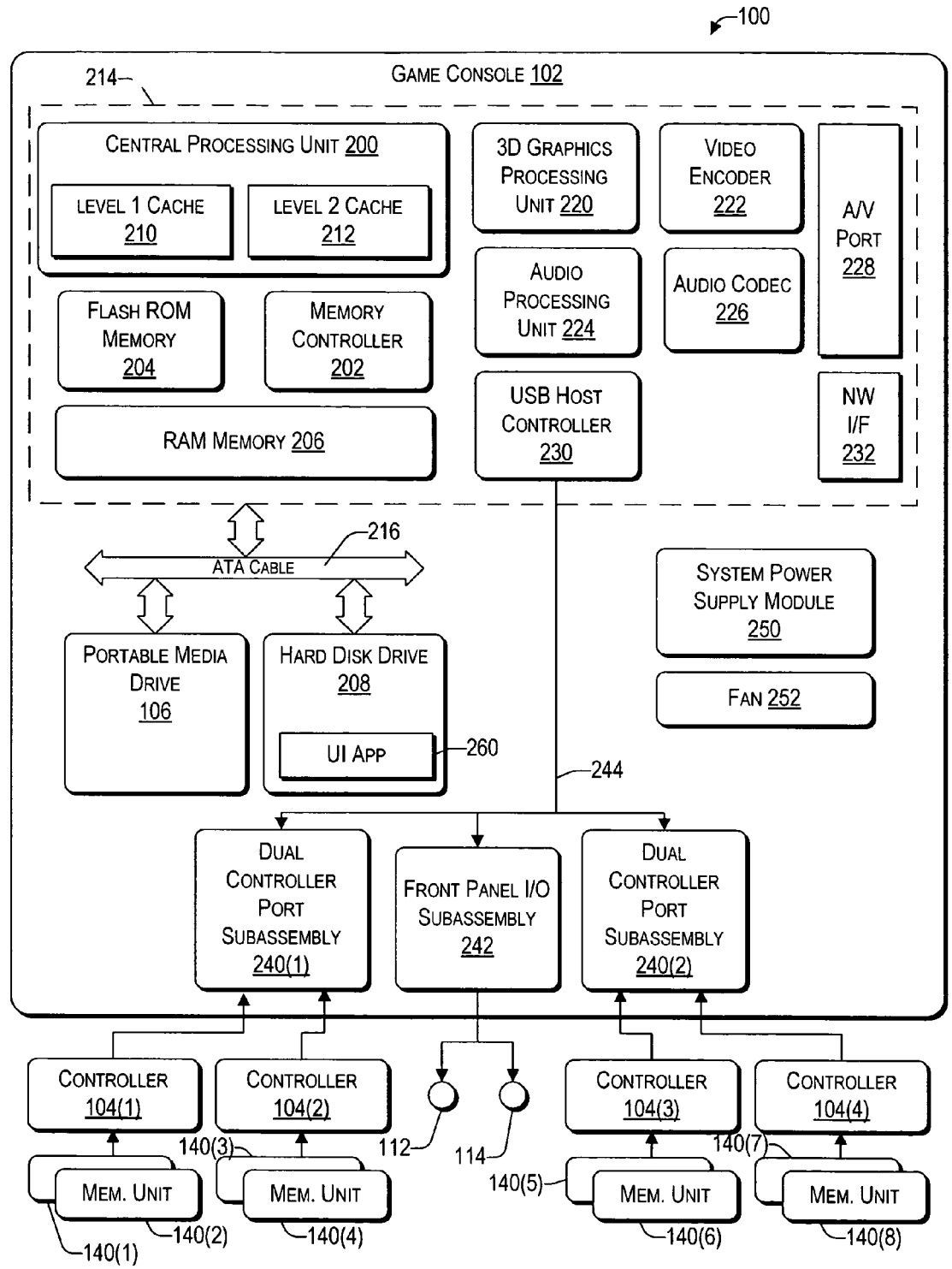
FIG. 2 illustrates a block diagram of the gaming system shown in FIG. 1.

FIG. 2 shows functional components of the gaming system 100 in more detail. The game console 102 has a central processing unit (CPU) 200 and a memory controller 202 that facilitates processor access to various types of memory, including a flash ROM (Read Only Memory) 204, a RAM (Random Access Memory) 206, a hard disk drive 208, and the portable media drive 106. The CPU 200 is equipped with a level 1 cache 210 and a level 2 cache 212 to temporarily store data and hence reduce the number of memory access cycles, thereby improving processing speed and throughput.

The CPU 200, memory controller 202, and various memory devices are interconnected via one or more buses, including serial and parallel buses, a memory bus, a peripheral bus, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

As one suitable implementation, the CPU 200, memory controller 202, ROM 204, and RAM 206 are integrated onto a common module 214. In this implementation, ROM 204 is configured as a flash ROM that is connected to the memory controller 202 via a PCI (Peripheral Component Interconnect) bus and a ROM bus (neither of which are shown). RAM 206 is configured as multiple DDR SDRAM (Double Data Rate Synchronous Dynamic RAM) that are independently controlled by the memory controller 202 via separate buses (not shown). The hard disk drive 208 and portable media drive 106 are connected to the memory controller via the PCI bus and an ATA (AT Attachment) bus 216.

A 3D graphics processing unit 220 and a video encoder 222 form a video processing pipeline for high speed and high resolution graphics processing. Data is carried from the graphics processing unit 220 to the video encoder 222 via a digital video bus (not shown). An audio processing unit 224 and an audio codec (coder/decoder) 226 form a corresponding audio processing pipeline with high fidelity and stereo processing. Audio data is carried between the audio processing unit 224 and the audio codec 226 via a communication link (not shown). The video and audio processing pipelines output data to an A/V (audio/video) port 228 for transmission to the television or other display. In the illustrated implementation, the video and audio processing components 220-228 are mounted on the module 214.

Also implemented on the module 214 are a USB host controller 230 and a network interface 232. The USB host controller 230 is coupled to the CPU 200 and the memory controller 202 via a bus (e.g., PCI bus) and serves as host for the peripheral controllers 104(1)-104(4). The network interface 232 provides access to a network (e.g., Internet, home network, etc.) and may be any of a wide variety of various wire or wireless interface components including an Ethernet card, a modem, a Bluetooth module, a cable modem, and the like.

The game console 102 has two dual controller support subassemblies 240(1) and 240(2), with each subassembly supporting two game controllers 104(1)-104(4). A front panel I/O subassembly 242 supports the functionality of the power button 112 and the eject button 114, as well as any LEDs (light emitting diodes) or other indicators exposed on the outer surface of the game console. The subassemblies 240(1), 240(2), and 242 are coupled to the module 214 via one or more cable assemblies 244.

Eight memory units 140(1)-140(8) are illustrated as being connectable to the four controllers 104(1)-104(4), i.e., two memory units for each controller. Each memory unit 140 offers additional storage on which games, game parameters, and other data may be stored. When inserted into a controller, the memory unit 140 can be accessed by the memory controller 202.

A system power supply module 250 provides power to the components of the gaming system 100. A fan 252 cools the circuitry within the game console 102.

The game console 102 implements a uniform media portal model that provides a consistent user interface and navigation hierarchy to move users through various entertainment areas. The portal model offers a convenient way to access content from multiple different media types—game data, audio data, and video data—regardless of the media type inserted into the portable media drive 106.

To implement the uniform media portal model, a console user interface (UI) application 260 is stored on the hard disk drive 208. When the game console is powered on, various portions of the console application 260 are loaded into RAM 206 and/or caches 210, 212 and executed on the CPU 200. The console application 260 presents a graphical user interface that provides a consistent user experience when navigating to different media types available on the game console. The UI application and exemplary screen displays it presents are described below in more detail beneath the headings "Uniform Media Portal" and "Operation".

The gaming system 100 may be operated as a standalone system by simply connecting the system to a television or other display. In this standalone mode, the gaming system 100 allows one or more players to play games, watch movies, or listen to music. However, with the integration of broadband connectivity made available through the network interface 232, the gaming system 100 may further be operated as a participant in a larger network gaming community. This network gaming environment is described next.

Figure 3:
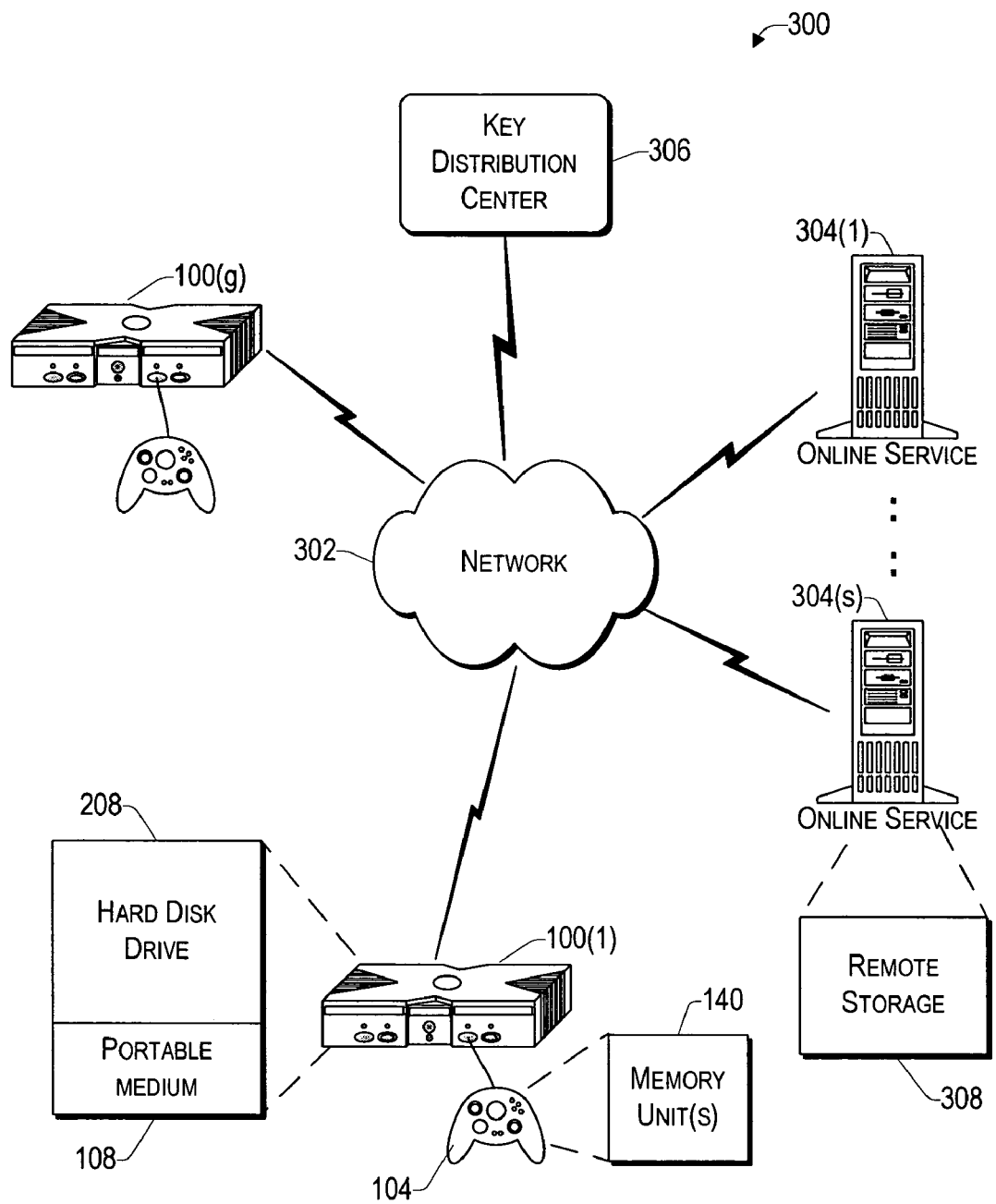
FIG. 3 illustrates a block diagram of a network gaming system.

FIG. 3 shows an exemplary network gaming environment 300 that interconnects multiple gaming systems 100(1), . . . , 100(g) via a network 302. The network 302 represents any of a wide variety of data communications networks. It may include public portions (e.g., the Internet) as well as private portions (e.g., a residential Local Area Network (LAN)), as well as combinations of public and private portions. Network 302 may be implemented using any one or more of a wide variety of conventional communications media including both wired and wireless media. Any of a wide variety of communications protocols can be used to communicate data via network 302, including both public and proprietary protocols. Examples of such protocols include TCP/IP, IPX/SPX, NetBEUI, etc. Network gaming environment 300 may by a client/server type environment wherein gaming clients utilize servers as conduits to communicate with other gaming clients. Network gaming environment 300 may also be a peer-to-peer environment where gaming clients connect directly with each other.

In addition to gaming systems 100, one or more online services 304(1), . . . , 304(s) may be accessible via the network 302 to provide various services for the participants, such as hosting online games, serving downloadable music or video files, hosting gaming competitions, serving streaming audio/video files, and the like. The network gaming environment 300 may further involve a key distribution center 306 that plays a role in authenticating individual players and/or gaming systems 100 to one another as well as online services 304. The distribution center 306 distributes keys and service tickets to valid participants that may then be used to form games amongst multiple players or to purchase services from the online services 304.

The network gaming environment 300 introduces another memory source available to individual gaming systems 100—online storage. In addition to the portable storage medium 108, the hard disk drive 208, and the memory unit(s) 140, the gaming system 100(1) can also access data files available at remote storage locations via the network 302, as exemplified by remote storage 308 at online service 304(s).

The uniform media portal model accommodates the network gaming environment. As an example, when a user purchases a game, the model can provide the user with navigation points for downloading upgrades for that game and viewing high scores online specific to the game title.

ILLUSTRATIVE EMBODIMENTS OF THE INVENTION

The present invention provides a multilevel online tournament which allows tournament participants to avoid lengthy waiting times for the next tournament round to start. Utilizing the systems and methods of the present invention, online tournaments can be created that include hundreds or even thousands of participants (teams or players). In one or more embodiments of the invention, pre-registration is not required for participants, they simply sign up for the tournament a few minutes prior to the start of the tournament and play all matches back-to-back. By way of general overview of the invention, in the first tournament round all participants are placed in a single bracket and any participant is permitted to match up with any other tournament participant. All participants advance to the next tournament round. The next tournament round is split into a winners bracket and a losers bracket, and tournament participants again match up with any other participant within their bracket. All participants in the winners (W) bracket advance to the next tournament round, with winners bracket winners advancing to a winners-winners (WW) bracket, and losers advancing to the winners-losers (WL) bracket. Of those playing in the losers (L) bracket, the winners advance to the losers-winners (LW) bracket, while the losers advance to the losers-losers (LL) bracket. This process repeats each round until there is only a single participant remaining in each bracket. This online tournament format is referred to herein as a multilevel tournament. The determination of matchups, handling of player bracketing, system administration, and other tournament details are discussed in more detail below.

Figure 4:
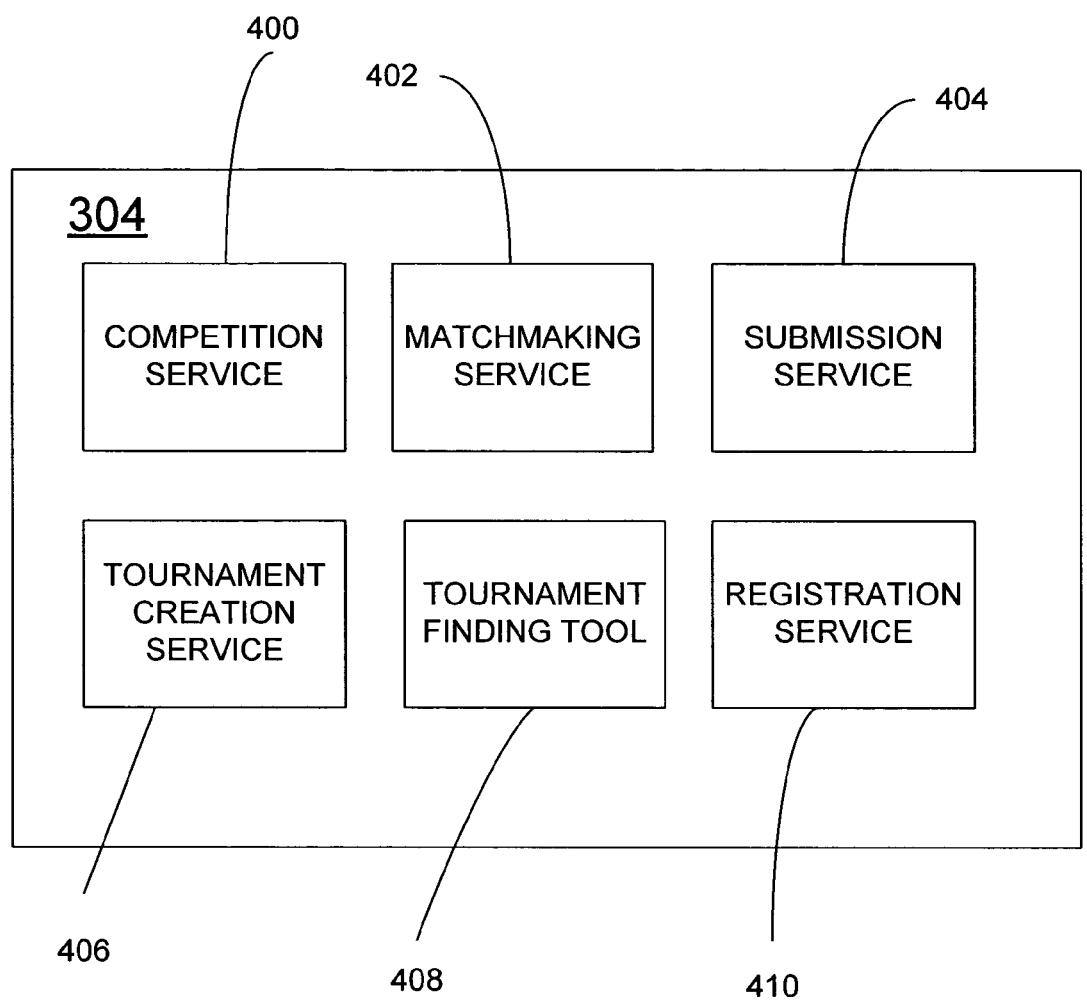
FIG. 4 illustrates a more detailed view of the online services component of the network gaming system of FIG. 3.

FIG. 4 provides a block diagram that describes various components of network gaming environment 300 that are useful in practicing embodiments of the present invention. Online services 304 may comprise various sub-services such as competition service 400 which manages the tournament progression features of the present invention. Also included may be matchmaking service 402 which allows tournament participants to find other participants to match up against in competitive play. Submission service 404 provides tournament administrators with the ability to submit the necessary configuration information for beginning the process of creating an online tournament. Tournament creation service 406 provides an interface by which tournament administrators can create a multilevel online tournament according to one or more aspects of the invention. In some embodiments, tournament creation service 406 may include a web service call that includes a set of parameters such as tournament name, start date, round recurrence interval, and possibly other options specific to the game being played (e.g., game mode, map, etc.). A tournament finding tool 408 such as OptiMatch® may also be provided to help potential tournament participants search for available tournaments online. These searches may be based upon desired tournament characteristics selected by the potential participant (e.g., novice competitors, advanced competitors, etc.). In other embodiments tournament finding tool 408 may select a tournament for the potential participant based on a user profile stored somewhere on gaming system 100 or in remote storage 308. Registration service 410 provides the functionality necessary to register potential tournament participants for the tournament.

An online tournament according to aspects of the present invention may have multiple phases including: pre-tournament, tournament, and post-tournament. The phases delineated herein are not intended to represent strict dividing lines, but rather are merely intended to provide a conceptual model by which the present invention may be more readily understood by those of skill in the art.

Figure 5:
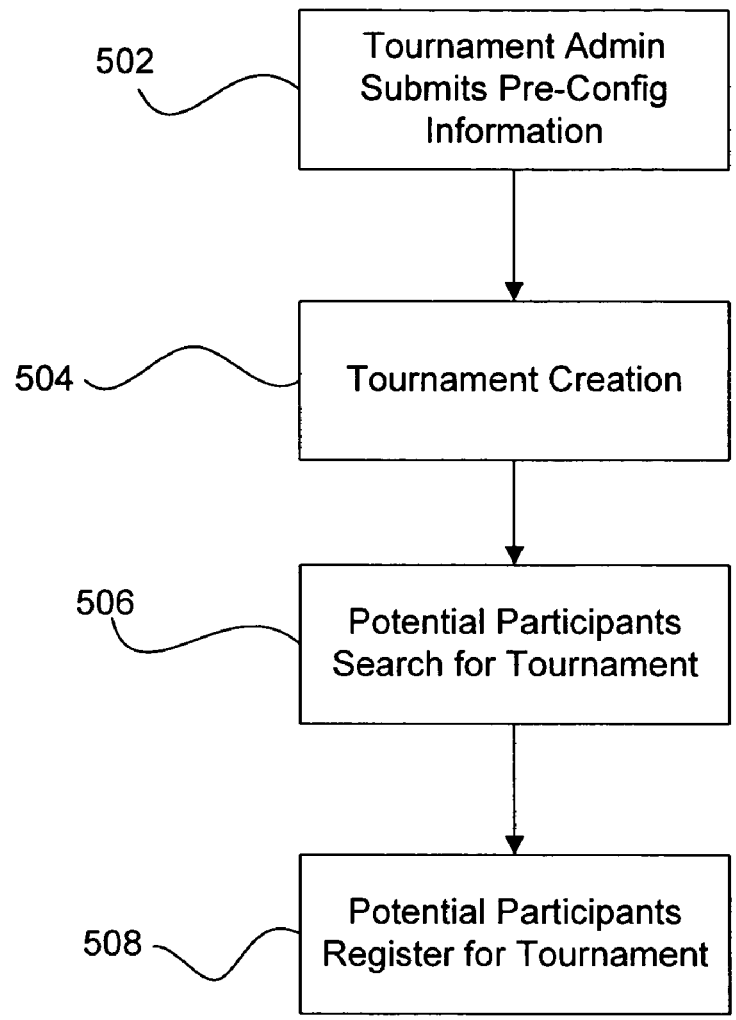
FIG. 5 illustrates the steps involved in the practicing the pre-tournament phase according to aspects of the present invention.

The pre-tournament phase generally includes the organizing routines for a multilevel online tournament. These organizing routines may include a number of administrative tasks that are necessary for organizing a large number of players for a structured competition. Referring now to FIG. 5, a flow chart illustrates steps that may take place during the pre-tournament phase according to aspects of the present invention. At step 502, a tournament administrator submits pre-configuration information about a competition to online services 304 using submission service 404. Pre-configuration information is used to provide the options that will be available to a tournament administrator when the tournament administrator creates an online tournament. In one or more embodiments, the tournament administrator is a video game publisher and the online service is online game service known in the art such as Xbox® Live that allows the publisher to submit tournament information about a particular game title. The configuration information provided via submission service 404 may include general information that allows online services 304 (e.g. Xbox® Live) to be configured to provide a suitable platform for conducting the online tournament for the game title provided. For example, the configuration information may provide the competition types that are available for the game title (e.g., single elimination, Swiss format, multilevel). It may also include game-specific parameters, such as game map (e.g. Battlecreek, Mountain Terrain, etc.) or game mode (e.g. Capture the Flag, Last Man Standing, etc.). Other information that may be provided via submission service 404 includes the number of allowed leader boards for each competition type. Auxiliary tournament leaderboards can be used to track relevant tournament-wide stats. For example, for a football tournament you may want to find out who had the best offense or defense in the tournament (passing, rushing, sacking, etc.). In one embodiment of the invention, a multilevel tournament includes as many as sixteen round-specific leader boards and three overall leader boards. The information submitted via submission service 404 may be combined with other submission information and certified by some certifying authority as valid for use with online game services 304. Once the submission has been certified, it may be configured within online service 304 to allow authorized users (e.g. tournament administrators) to create online tournaments for that particular game title.

At step 504, the multilevel tournament is created by a tournament administrator. The options available for creating the tournament will be defined in part by the pre-configuration information submitted at step 502. In one or more embodiments of the invention, the game publisher serves as the tournament administrator and uses tournament creation service 406 to create the tournament. Tournament creation service 406 may be a web service call available only to game publishers, or in other embodiments, it may be a client side application programming interface (API) if individual clients are allowed to create or initiate tournaments. Certain parameters may be received for use in creating a multilevel online tournament. These parameters may include tournament name, start date and time, round recurrence interval, match schedule, etc. Standard competition options may be predefined by the game publisher or some other party. A tournament administrator may specify a list of players to automatically place in the tournament. Where the tournament administrator is a game publisher, the automatic enrollment feature may be useful for offering tournament registration through a website rather than through the online game services 304.

At step 506, potential tournament participants search for a tournament for which they are eligible to register. Because the tournament was created in step 504, potential participants will be able to find the newly created tournament during step 506. In some embodiments, a user specifies preferred tournament characteristics and searches the online service 304 for a tournament that matches preferred characteristics. In other embodiments, the game title may be configured in step 502 so that the online service 304 finds the most appropriate competition for a potential tournament participant based on a user profile of the potential participant. This determination may occur transparently to the potential tournament participant such that they will be presented only with tournament options that are appropriate to their skill level or some other aspect of their user profile.

At step 508, upon identifying a suitable tournament, potential tournament participants join the identified multilevel tournament (also referred to as "signing up" or "registering for") thereby transitioning from potential tournament participant to tournament participant. If the multilevel tournament is a team competition, teams are permitted to join. If the tournament is an individual competition, individual players are permitted to join. As provided above, a potential tournament participant can either search for a tournament to join, or the tournament administrator can pre-enroll participants. A tournament administrator may also invite competitors to join the tournament as well, using a preexisting invitation service of online service 304. When a player or team registers for the tournament, registration service 410 may verify that there are open slots available for the participant. In some embodiments, the eligibility of the tournament participant (which can be either an individual player or a team) may be verified by registration service 410. In other embodiments, registration verification may take place on the client-side using code written into the game title by the publisher. Various items of information may be used for determining eligibility. For example, attributes such as team affiliation, user location or ranking may be used to determine whether a potential tournament participant may join a tournament.

Figure 6:
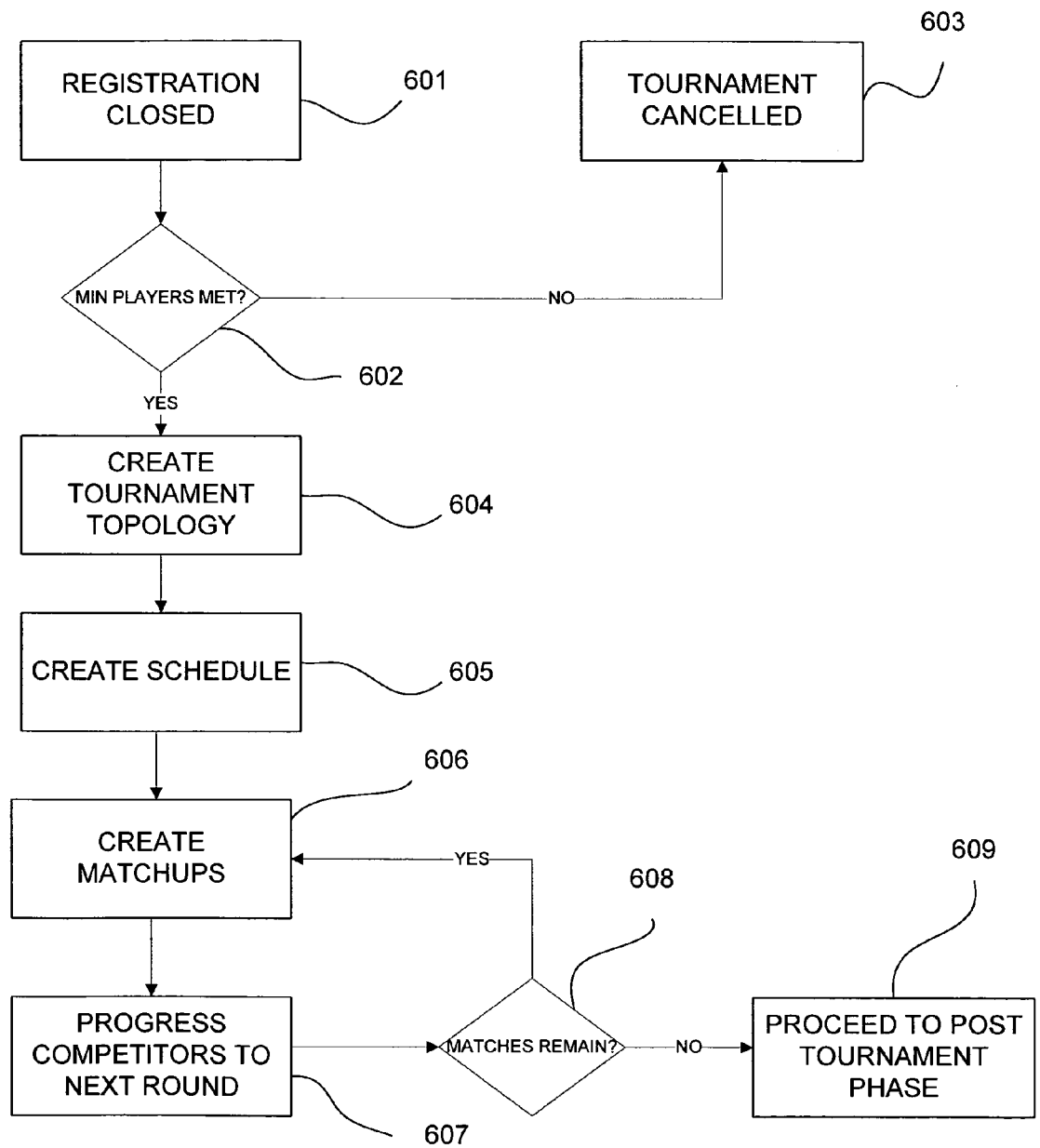
FIG. 6 illustrates a method for conducting a tournament according to aspects of the present invention.

FIG. 6 generally illustrates a method for conducting the tournament phase of a multilevel online tournament according to one or more aspects of the present invention. At step 601, the registration period is closed and no additional tournament participants may be added. Next, at step 602, the system determines whether the minimum required number of players have joined the tournament. As discussed previously, this minimum required number of tournament participants may be specified or determined during creation of the tournament. If the minimum required number of tournament participants has not joined, the tournament is canceled at step 603.

If the minimum player requirement is met, the tournament topology (i.e., the tournament bracketing) is then created at step 604 to accommodate the verified tournament participants. Tournament topology creation is discussed in more detail below. Once the tournament topology is created, the schedule defined during the tournament creation step 504 (in FIG. 5) is provided to the tournament participants at step 605. In some embodiments, the schedule may be given to tournament participants prior to their joining the tournament. Next, at step 606, tournament participants are matched against each other (where possible) by matchmaking service 402 and the tournament participants compete with each other in the first tournament round. Matchmaking is discussed in more detail below. After the first tournament round matches are complete, progression step 607 advances tournament participants into the next tournament round and places them in the appropriate brackets. Step 607 is discussed in more detail below. At step 608, the system determines whether matches still remain to be played. This determination is typically based on the number of participants in the bracket. For example, if only one player remains in a bracket for a game that requires two or more players, no additional matches remain for that player. The tournament ends when no matches remain for any players. Thus, if no matches (and consequently, no tournament rounds) remain, the system proceeds to step 609 and proceeds to the post-tournament phase. Otherwise, if matches or tournament rounds remain, the system returns to step 606 to setup the remaining matches.

Figure 7:
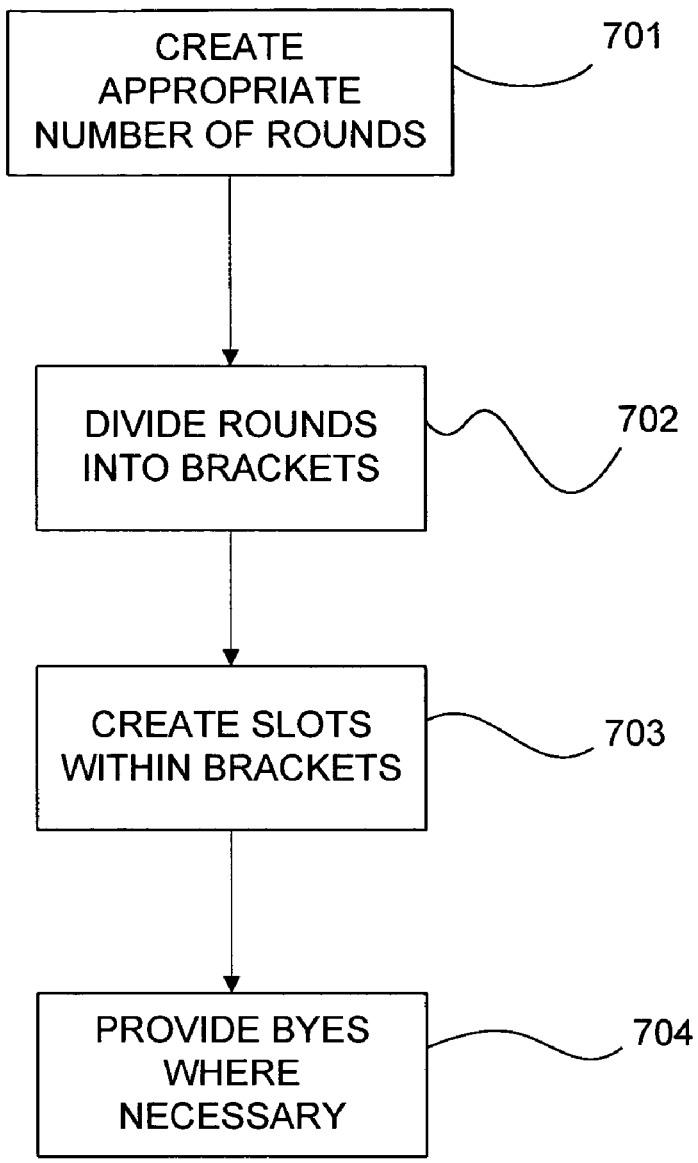
FIG. 7 provides an example of the creation of a multilevel tournament bracketing according to aspects of the present invention.

Referring now to FIG. 7 a general method for creating the tournament topology as provided in step 604 is shown. Based on the number of tournament participants, the appropriate number of rounds is created at step 701. Next, the rounds are divided into the appropriate number of brackets at step 702. In step 703, the appropriate numbers of slots are created within each bracket. At step 704, byes (discussed in additional detail below) are provided in the bracket when they are necessary.

FIG. 8 provides pseudo-code that describes in more detail the method of FIG. 7 for creating the tournament topology according to an embodiment of the present invention. In order to more easily understand the pseudo-code provided, the following notation will be used in describing rounds, brackets, and slots. First, the value R denotes the number of rounds that are in the tournament. The value P denotes the number of tournament participants that have registered for the tournament. A pair of integers enclosed in parenthesis refers to a bracket within a round. For example, (m,n) refers to the $n^{th}$ bracket in the $m^{th}$ round of the tournament. Or, more specifically, (1,1) refers to the first bracket in the first round of the tournament. The expression S(m,n) refers to the number of slots (i.e., player/team openings) created in the $n^{th}$ bracket in the $m^{th}$ round. The expression P(m,n) refers to the number of tournament participants in the $n^{th}$ bracket in the $m^{th}$ round. Likewise, the expression B(m,n) refers to the number of byes in the $n^{th}$ bracket in the $m^{th}$ round. An implementation of the pseudo-code of FIG. 8 begins with the system calculating the number of rounds in the tournament. The following equation provides this calculation:

$$R = \log_2(\text{Next Power of 2 greater than } P) \quad \text{Equation 1}$$

After determining R, the system creates R tournament rounds. Next, the system creates the first round bracket, Bracket(1,1) and calculates the appropriate number of S(1,1) in Bracket(1,1) using the following equation:

$$S(1,1) = \text{Next Power of 2 Greater Than } P(1,1) \quad \text{Equation 2}$$

Thus, if there are 10 participants in round 1, S(1,1) is 16. Once the slots have been created, the Bracket(1,1) byes are created using the equation:

$$B(1,1) = S(1,1) - P(1,1) \quad \text{Equation 3}$$

Although Equation 3 may produce a large number of byes, in some embodiments it may be advantageous to do so in order is to avoid odd number of players in subsequent tournament rounds. In addition, other embodiments may forgo the use of byes, instead relying on match play and autoprogression (discussed in more detail below) for tournament advancement.

After creating the first tournament round, the first tournament round is played and completed by the tournament participants. At the start of each subsequent tournament round (i.e., rounds 2-m), the system creates the Brackets for the round according to the following algorithm: for each bracket in just completed non-final round, create two brackets (winners and losers) in the next tournament round. Once the brackets have been created, the appropriate number of slots is created within each bracket. Given S(m,n), then the number of slots in the winners bracket, i.e.,: S(m+1, 2n−1), and the number of slots in the losers bracket, i.e., S(m+1, 2n), can each be calculated as follows:

$$S(m+1, 2n-1) = S(m,n)/2 \quad \text{Equation 4a}$$

$$S(m+1, 2n) = S(m,n)/2 \quad \text{Equation 4b}$$

Figure 9:
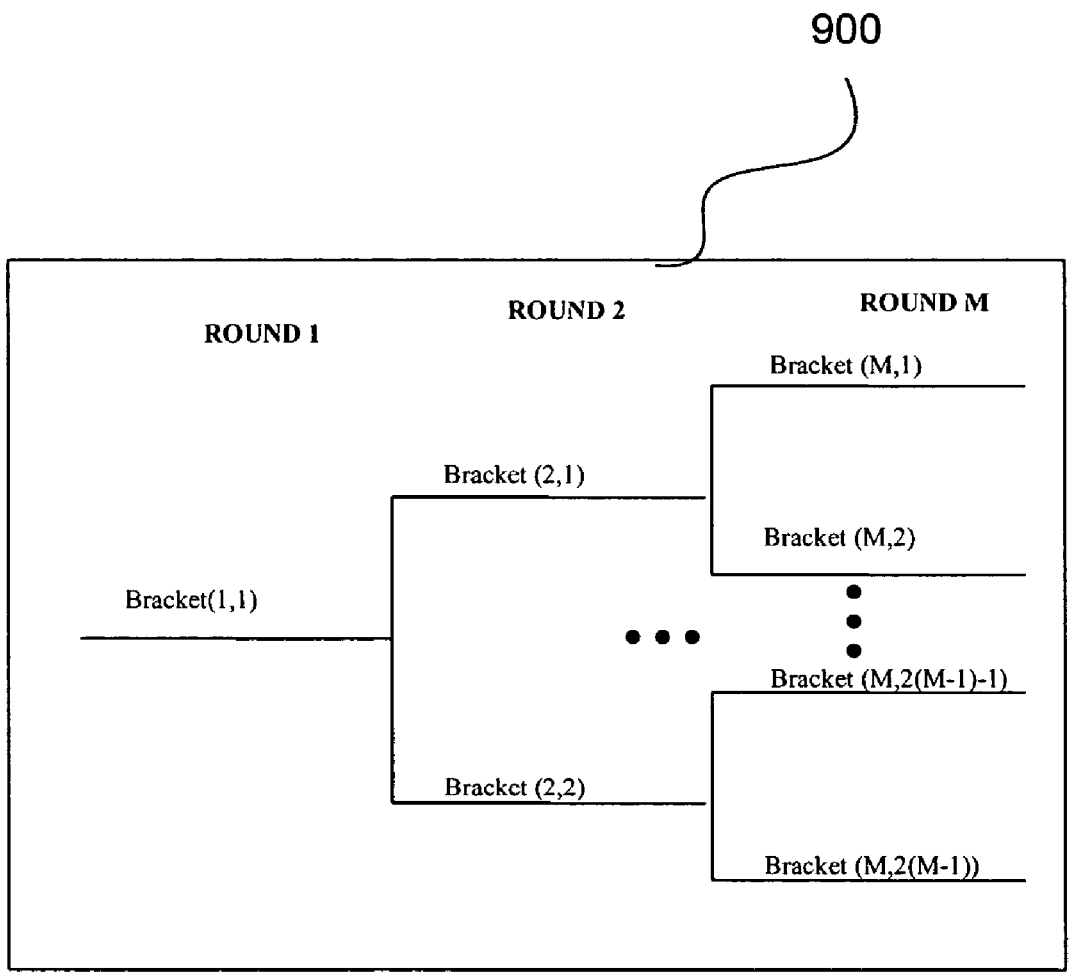
FIG. 9 provides an example of a tournament bracketing created according to aspects of the invention.

Lastly, using Equation 3, the system creates any necessary byes in each bracket. Following these steps may result in the creation of a tournament bracketing similar to the bracketing 900 illustrated in FIG. 9.

Figure 10:
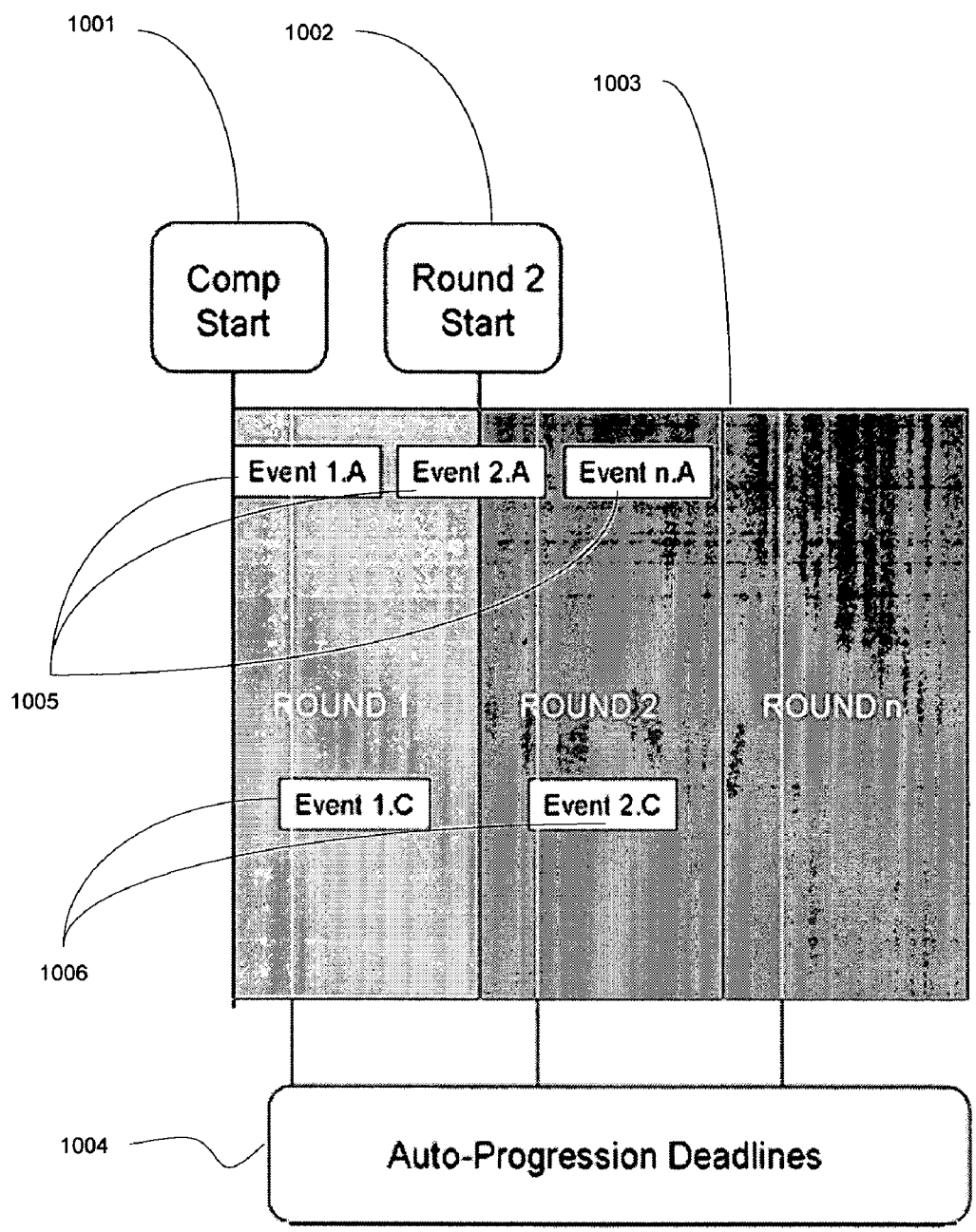
FIG. 10 provides a block diagram that shows a tournament schedule according to an aspect of the invention.

The block diagram in FIG. 10 illustrates an example of a tournament schedule created at step 605. The tournament schedule provides a temporal framework including tournament deadlines by which the multilevel tournament may be conducted such that it progresses predictably with respect to time. As discussed previously, a multilevel online tournament according to the present invention may be characterized as having three phases: pre-tournament set up, tournament play, and post-tournament administration. FIG. 10 shows the tournament play phase which begins at the competition (Round 1) start time 1001. At this time, the first round of the tournament commences by matching up tournament participants. The lines passing through each of Round 1, Round 2 and Round n are auto-progression deadlines 1004. The auto-progression deadline (APD) is a time by which all tournament participants must either register for their tournament match or request an automatic progression or bye into the next round.

In one or more embodiments, if a tournament participant fails to take action prior to the APD in any given round, the participant is eliminated from the tournament. In other embodiments, the participant may simply be auto-progressed to the losers' bracket of the next tournament round. The APD may be specified relatively to the starting time of the round and may apply equally to each of the tournament rounds.

As discussed in connection with FIG. 5 and step 502, when the tournament is created, the tournament administrator may specify a round recurrence interval (RRI). The RRI is a value that determines the start time for each round of the tournament subsequent to Round 1. Typically, the RRI is set such that a typical match between any two tournament participants can be completed within the interval. The RRI may be set so that each new round immediately follows the previous one, and rounds run consecutively. In other embodiments, the round recurrence interval could be a daily or weekly interval rather than back-to-back.

Although the start of each round is set at an interval from the previous round, the RRI does not prevent faster players from advancing at a more rapid pace than the round recurrence interval suggests. Instead, the RRI represents a maximum time interval per round, preventing the tournament from taking an unnecessarily long amount of time. For example, referring to Events 1.A, 2.A and n.A at 1005 in FIG. 10, these events represent matches involving tournament participant A. Event 1.A represents the first round match for tournament participant A. The match ends relatively quickly. According to aspects of the present invention as discussed herein, tournament participant A may immediately being his second round match, even though the first round has not ended. Put another way, a player need not wait for Round m to start in order to being a Round m match—provided, of course, that an opponent can be found.

Figure 11:
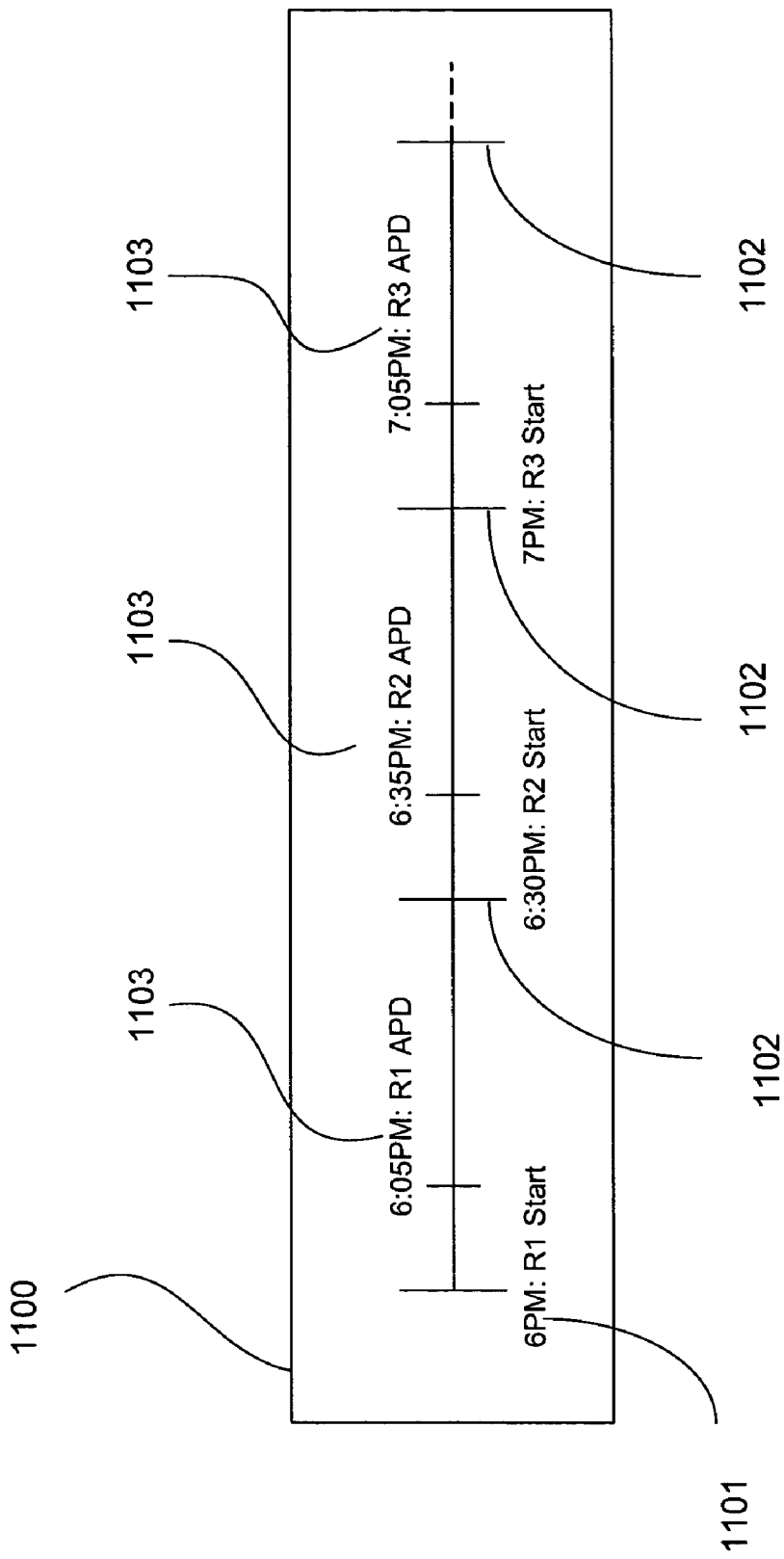
FIG. 11 provides an example of advancing tournament participants via the auto-progression tool due to a player disconnect according to aspects of the present invention.

The RRI may be used to enforce tournament deadlines for completing matches. For example, Events 1.C and 2.C each represent a match 1006 involving tournament participant C. Each of the matches is required to finish prior to the end of the RRI (i.e., the beginning of the next round). This deadline enforcement is provided by specifying an arbitration deadline when a tournament match is registered with session arbitration (discussed below). To further illustrate how deadlines may be enforced, a sample timeline 1100 is shown in FIG. 11 with a competition starting time of 6:00 PM, a round recurrence interval (RRI) of 30 minutes, and an APD of 5 minutes.

Referring back to FIG. 6, at step 606, matches between tournament participants are created and matches are played. In one or more embodiments of the invention, matchmaking service 402 is used to allow tournament participants to find each other to play a match. In other embodiments, some other service such as the competition service 400 or a session creation service may provide match-ups between tournament participants. A tournament participant is permitted to match-up with any other tournament participant, so long as they are each within the same tournament bracket. Matchmaking service 402 may use some combination of a UserID/BracketID pair to determine whether two tournament participants are located within the same tournament bracket. Thus, according to aspects of the present invention, when a tournament participant progresses from one round to the next round, he may immediately begin searching for a new opponent using matchmaking service 402 to determine whether there are other tournament participants in his current bracket. If an available opponent is found, the tournament participant may propose a match-up using matchmaking service 402. If the match-up is accepted by the available opponent, or if the tournament automatically matches up the two participants, the two tournament participants play their match. In some embodiments, in order for the tournament match to take place, an arbitrated session is created to manage the tournament match. The arbitrated session provides a third-party verification of the match result to the competition service so that the tournament can trust the match result and tournament participants are advanced into the appropriate bracket of the next tournament round. The tournament participant and his opponent may agree on a deadline by which the match must be finished (the deadline is typically prior to the end of the current round). Both participants then register for the arbitrated session and proceed to play the match. During match play, online service 304 may be configured to record portions of the match and store the recording in remote storage 308. The video recording may be made available to tournament participants for viewing. For example, the matchup that decides the tournament champion may be recorded in its entirety so that tournament participants may view the match after the tournament has been completed.

Tournament participants progress through a multilevel online tournament in three ways: playing a tournament match via an arbitrated session, claiming an available bye, and requesting an auto-progression. Players progress into subsequent rounds until they reach the final round of the tournament or a terminal bracket. The final round in the tournament is round R, where R is the total number of rounds defined at step 701 in FIG. 7. A terminal bracket (a bracket with only a single tournament participant) may occur prior to round R in cases where the brackets become uneven due to the distribution of competitors.

Figure 12:
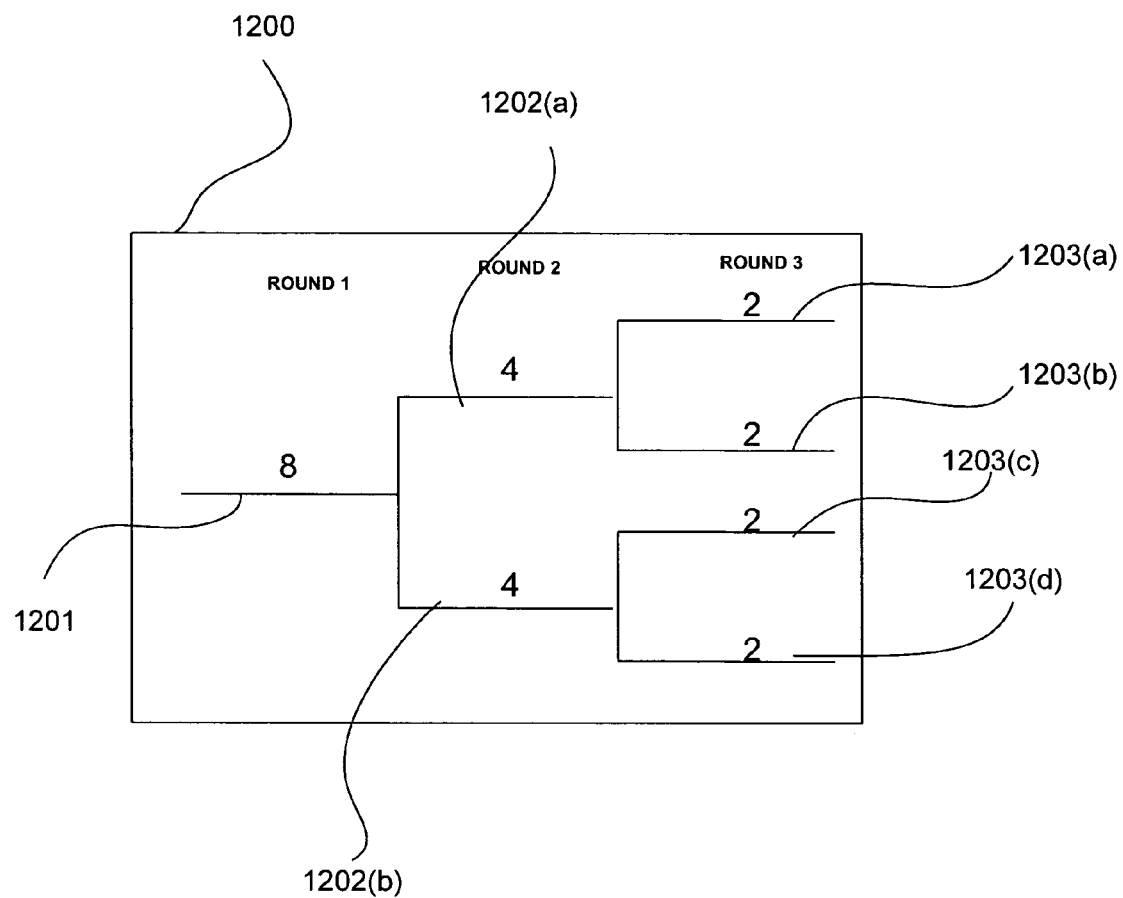
FIG. 12 provides an example of normal advancement of tournament participants via a multilevel online tournament bracket.

Referring now to FIG. 12, an example of a bracket 1200 describing a normal progression for a three round tournament according to aspects of the present invention is provided. The first round of the tournament has a total of eight tournament participants placed in the single first round bracket 1201. Under a normal progression scenario, four tournament matches are played, with the four winners advancing to second round winners bracket 1202(a) and the four losers advancing to second round losers bracket 1202(b). The four winners bracket tournament participants match-up amongst themselves to play two matches, with winners advancing to third round winners-winners bracket 1203(a) and the losers advancing to third round winners-losers bracket 1203(b). The four losers bracket tournament participants likewise match-up to play two matches, with the two winners advancing to third round losers-winners bracket 1203(c) and the two losers advancing to third round losers-losers bracket 1203(d). In the present example, upon completion of the third round, each player can be individually ranked in the tournament results based on the third round outcomes.

Figure 13:
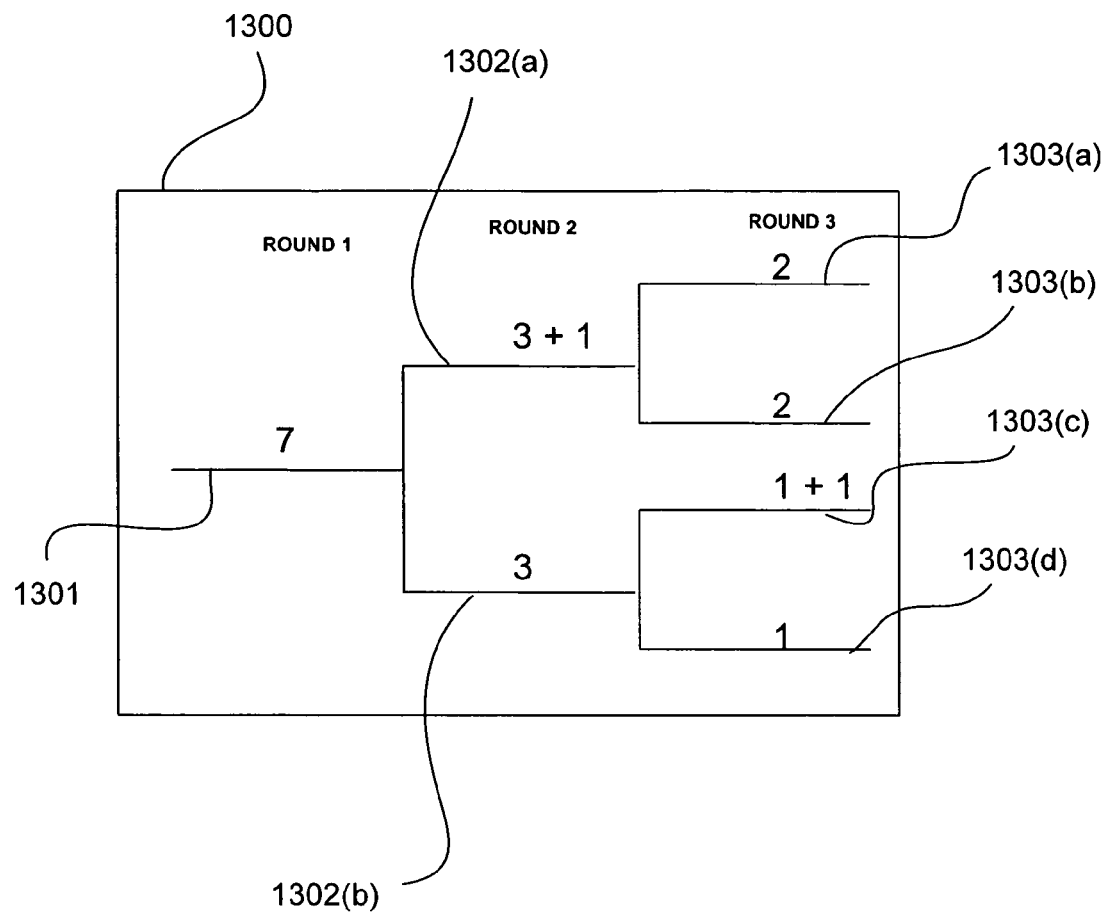
FIG. 13 provides an example of how the tournament progresses when a first round bye is necessary.

Referring now to FIG. 13, an example of a bracket 1300 is provided that illustrates how tournament participants may advance via a bye. As previously discussed, byes may become necessary when a non-power of two (i.e. not equal to $2^n$) of tournament participants end up within the same tournament bracket. In the example provided, the online tournament begins with only seven participants placed in a single first round bracket 1301. Because of the odd number of tournament participants in the bracket, only three matches can be played among six of the tournament participants. From these three matches, the winners will each advance to the second round winners bracket 1302(a). The three losers advance to the second round losers bracket 1302(b). The remaining participant is unable to match with another participant in the first round. Thus, the remaining participant may request a bye. In some embodiments of the present invention, the client must request the bye and the system must approve the bye where certain criteria are met. These criteria may include a requirement that the bracket have byes assigned to it, that there are remaining available byes, or that the request come in a specified time window between the start of the round and the APD for that round.

In other embodiments, the system automatically grants a bye to a selected competitor without requiring that the participant request the bye. Referring again to FIG. 13, the single participant that was given a bye advances to second round winners bracket 1302(a). Thus, second round winners (W) bracket 1302(a) includes four participants—three that advanced via an arbitrated game session plus one that advanced into the bracket via a bye. Second round losers (L) bracket 1302(b) has only three participants. As a result, a bye will be given to one of the three participants, while the other two will advance via results of a single arbitrated session. Third round losers-winners (LW) bracket 1303(c) will include a total of two tournament participants—one participant that advanced into the bracket via the arbitrated session and the other participant advanced into the bracket via the bye. Third round losers-losers (LL) bracket 1303(d) will include only a single competitor, and therefore is a terminal bracket.

A third way in which a tournament participant may advance to a next tournament round is via auto-progression. An auto-progression differs from a bye in that it is not a predetermined event on the tournament schedule. Byes are part of the tournament based on the number of players and the structure of the brackets. In contrast, an auto-progression occurs due to some event that occurs during the tournament. A tournament participant may request an auto-progression or it may be automatically granted by competition service 400 based on a number of situations. First, a tournament participant may request an auto-progression when another tournament participant disconnects from the online tournament. Second, an auto-progression may be appropriate where the last two players remaining in a bracket are unable to play against each other due to a NAT/QoS issue. This situation may arise when one or more of the tournament participants uses a router that is not certified by the tournament service provider. It may also arise in instances where a tournament participant's internet service provider (ISP) is malfunctioning. Auto-progressions may occur during any round and in any bracket of the competition.

Figure 14:
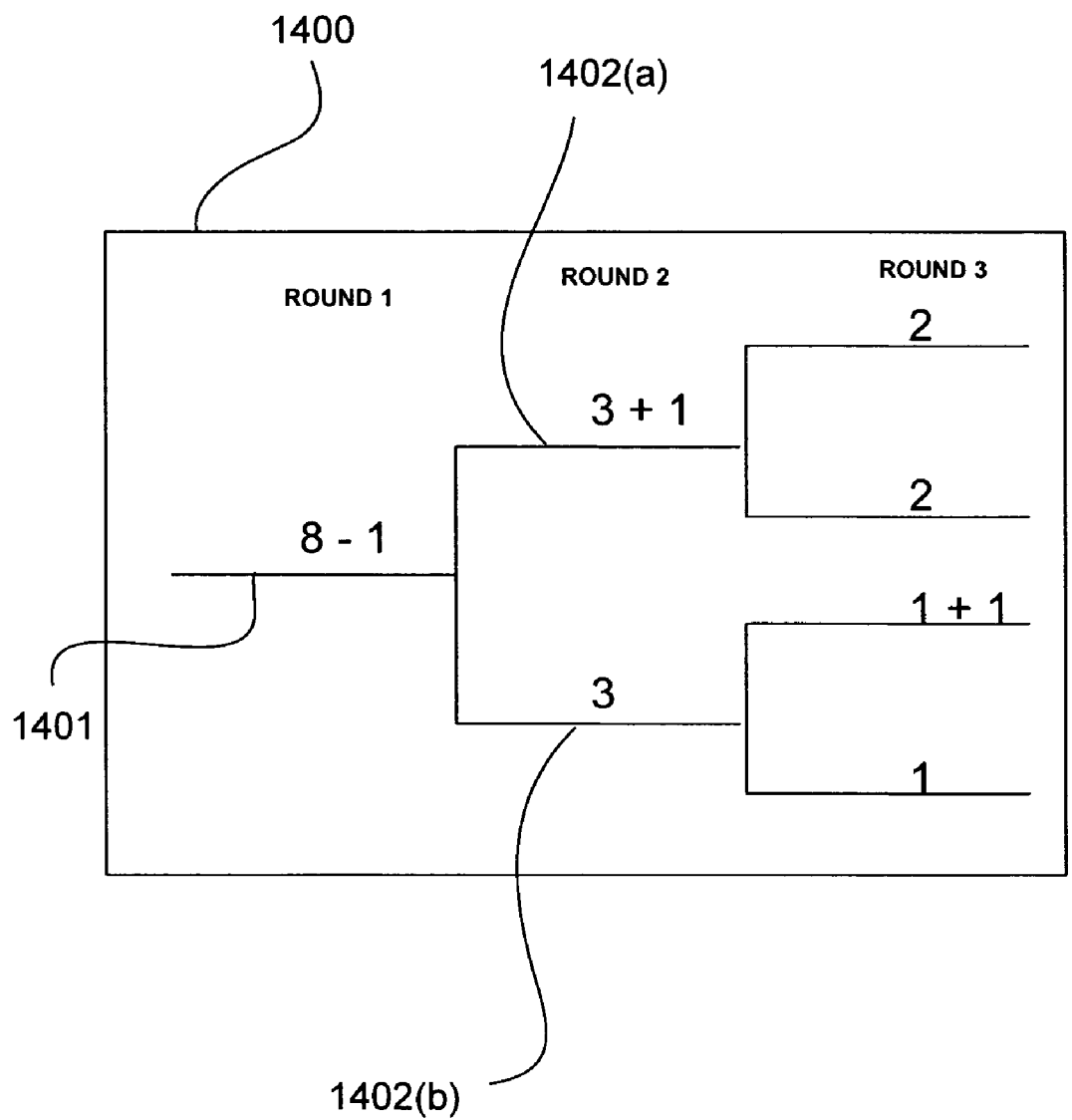
FIG. 14 illustrates an example of auto-progression due to a player disconnecting from the online tournament.

FIG. 14 illustrates a bracket 1400 that demonstrates advancement via auto-progression due to a disconnecting tournament participant. First tournament round bracket 1401 originally includes 8 tournament participants. One of the participants disconnects from the tournament. As a result, there are 8 minus 1 participants (i.e., 7) remaining in the bracket. Six of the remaining participants will match-up and play three matches via arbitrated session. The remaining participant that does not have an opponent may be granted an auto-progression into second round winners bracket 1402(a). After the auto-progression is granted, second round winners bracket 1402(a) will include three participants that advanced via arbitrated session plus one participant that advanced via auto-progression. Second round losers bracket 1402(b) will include only the three losers of the arbitrated sessions from the first round tournament bracket 1401, and the tournament progresses from round two similar to the illustrative bracket of FIG. 13.

Figure 15:
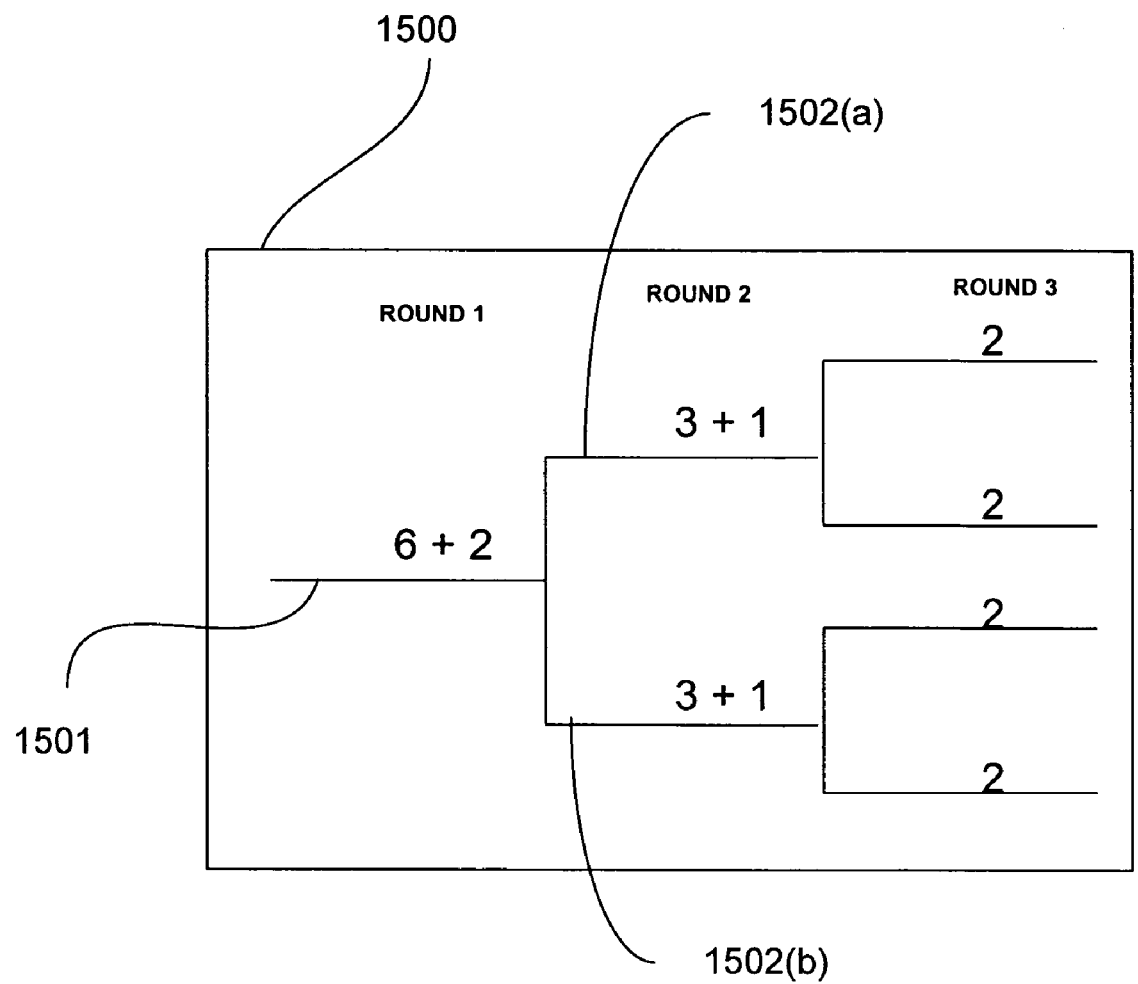
FIG. 15 illustrates advancing tournament participants via the auto-progression tool due to network address translation (NAT) or quality of service (QoS) problems.

Referring to FIG. 15, a bracket 1500 is provided that demonstrates advancement of tournament participants via auto-progression due to NAT/QoS problems. In this example, a total of eight tournament participants are placed in first round tournament bracket 1501. Six of the participants are able to match-up and play three arbitrated sessions. Two of the participants, however, are unable to connect for a match or complete a match due to NAT/QoS issues. As a result, three tournament participants advance to each of the second round brackets 1502(a) and 1502(b). In order to discourage tournament participants from registering for autoprogression when they could otherwise play, not every participant who could not connect is advanced to the second round winners bracket 1502(a). Thus, one of the participants is auto-progressed into the second round winners bracket 1502(a) and the other participant is auto-progressed to the second round losers bracket 1502(b). Advancing the tournament participants in this manner provides the further benefit of preventing the brackets from becoming uneven. As a result, each of the second round brackets includes three participants that progressed into the bracket via an arbitrated session and a single participant that auto-progressed into the bracket. In other embodiments, all autoprogressed players may be placed in the winners' bracket for the round, or all autoprogressed players may be placed in the losers' bracket for the round.

Figure 16:
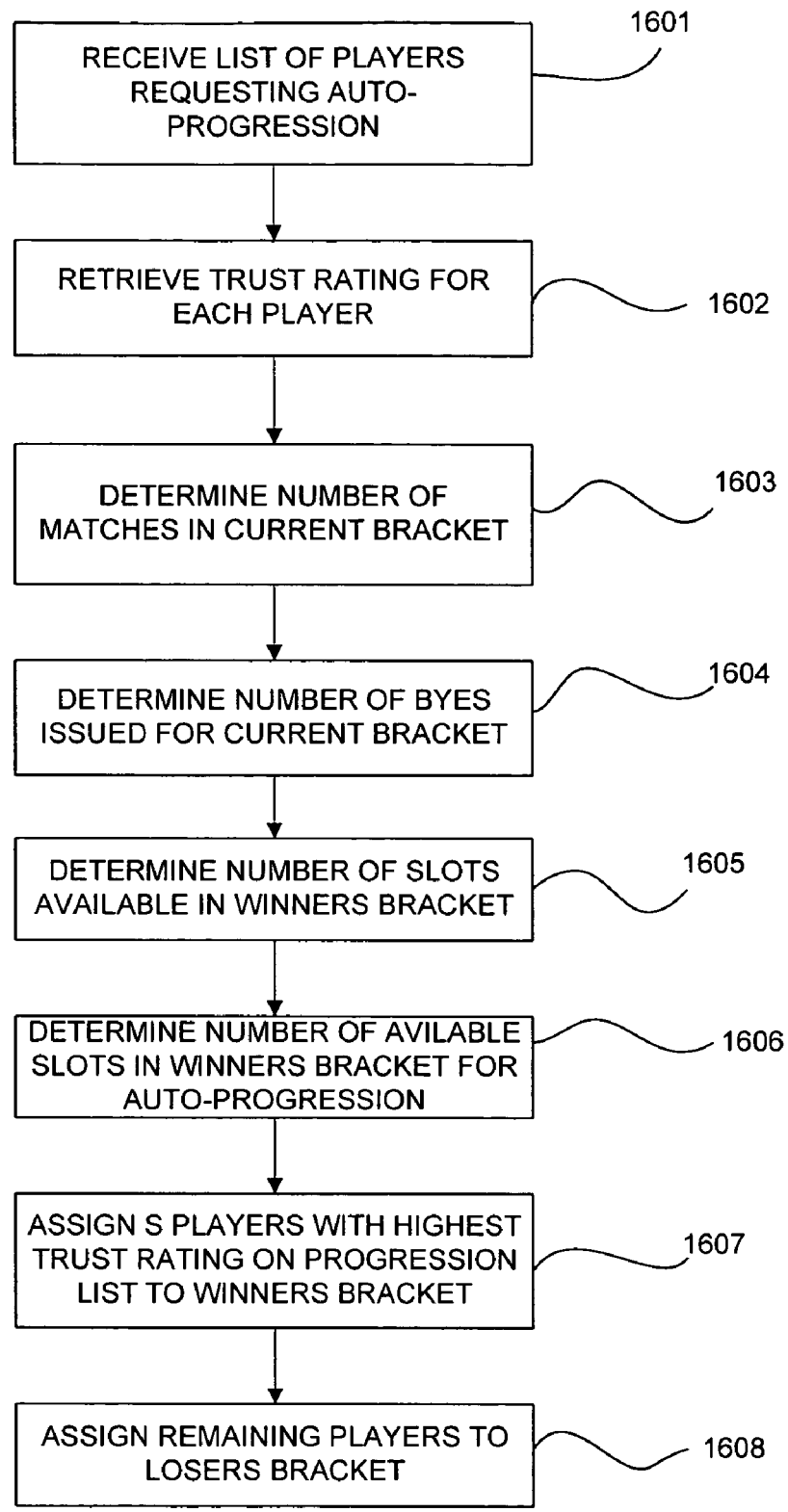
FIG. 16 shows a flowchart for determining which auto-progression requests are granted advancement to a winners bracket.

In order to determine which of the players requesting an auto-progression should be advanced into a winners bracket, competition service 400 may apply certain criterion to determine where each tournament participant should go. FIG. 16 illustrates a method for determining, according to an aspect of the invention, where to send each participant (i.e., winners or losers bracket). At step 1601, the system first receives the list of players requesting auto-progression from a tournament bracket. The system then retrieves a trust rating for each requestor at step 1602. A trust rating is a rating given to tournament participants that may be based on various factors related to trustworthiness and ability such as frequency of auto-progression requests, how often they drop out of tournaments, previous tournament results, or some other factors stored in the participant's user profile. The system then determines the number of successful matches (M) in the current bracket at 1603, the number of byes (B) that were issued in the current bracket at 1604, and the total number of slots (TS) in the next round winners bracket at 1605. At 1606, the system calculates the number of available slots (AS) for auto-progression in the winners bracket using the following equation:

$$AS = TS - M - B \qquad \text{Equation 5}$$

Once the number of available slots has been ascertained, the system assigns the participants with the highest trust ratings to each of the available slots at 1607. The remaining auto-progression requestors are then assigned to the next tournament round losers bracket at 1608.

In another embodiment, an alternative method may be used for determining where to send tournament participants via autoprogression. In this method, the tournament participants being advanced via autoprogression are sorted according to a relevant rating, and the top half (including the middle participant where the number of autoprogressions is odd) goes to the next tournament round winners bracket and the remaining tournament participants are advanced to the next tournament round losers bracket.

Figure 17:
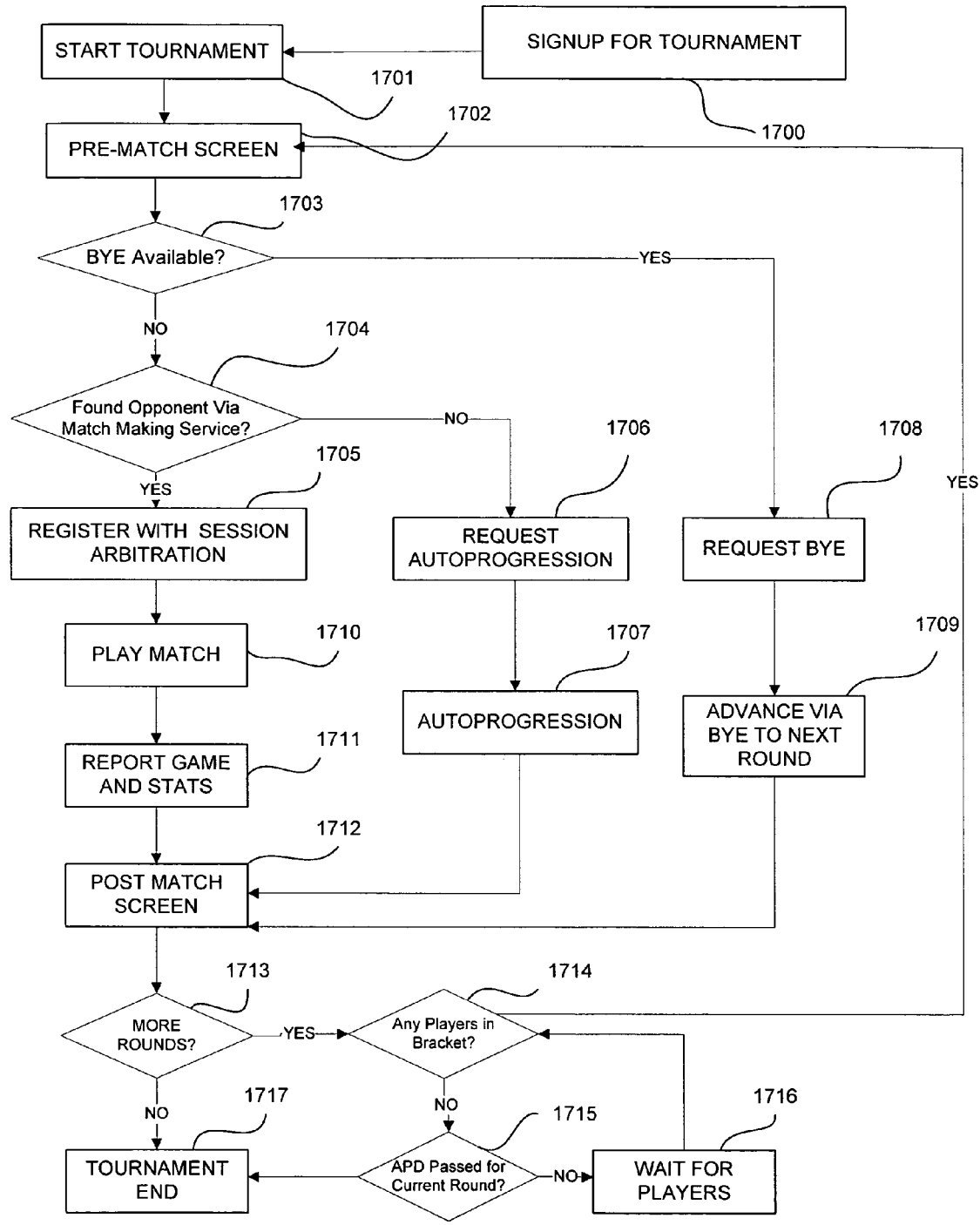
FIG. 17 provides a flowchart that describes a multilevel online tournament from a participant's point of view.

The invention has been described above from the viewpoint of the system that manages the online tournament. In order to more fully describe the invention, a flowchart is provided in FIG. 17 that illustrates the tournament flow from the point of view of a tournament participant. At step 1700, the participant signs up for the multilevel online tournament. At step 1701, the tournament begins. At step 1702, a pre-match screen is presented to the user that displays general information about the tournament. At step 1703, the system determines whether there are byes available for the first round. If byes are available, the participant may request a bye at step 1708, and advance via the requested bye to the next round at step 1709. If no byes are available, the participant attempts to find a match opponent at step 1704. If an opponent is found, the participant registers with session arbitration at step 1705 and proceeds to play the match at step 1710. Once the match has been completed, at step 1711 the game result and statistics are reported back to competition service 400 and a post-match result screen is displayed to the participant at step 1712. This screen may include game statistics and possibly links to video recordings of the action of the just completed match. If no opponent is found at step 1704, the participant requests an auto-progression at step 1706. The auto-progression is then granted at step 1707 (i.e., the user is placed in the appropriate winners or losers bracket) and the participant is then presented with the post-match screen at step 1712.

At step 1713, the system determines whether there are more rounds remaining to be played. If there are no remaining rounds, the tournament ends at step 1717. If there are remaining rounds, the system proceeds to step 1714 to determine whether there are any other players in the participant's bracket. If so, the participant is returned to pre-match screen at step 1702. If no other players are in the participant's bracket, the system checks to see whether the auto-progression deadline (APD) has passed for the current round at step 1715. If the APD deadline has not passed, the participant waits for players to advance into the bracket at step 1716. If the APD has passed, the tournament ends for that participant. Although ending the tournament due to a missed deadline may seem draconian, this policy does serve a purpose. It requires participants to be proactive in order to advance to a next tournament round. Because tournament advancement is only available to those who actively seek it out, the participants in each next tournament round are less likely to disconnect given that they actually made an effort to be moved into that round. As a result, the number of unexpected disconnects decreases, and player satisfaction increases. Alternatively, once the APD has passed, if the tournament participant has not played in a match, the system may automatically advance the tournament participant into the next tournament round.

Although the online gaming service has been generally described as an implementation for matches with a binary result (i.e. winner/loser), is should be appreciated that matches in a multilevel tournament can be for any number of players per match. For example, a multilevel online tournament according to the present invention can be implemented to support groups of tournament participants playing single-player racing games. Advancement in these games may be determined by whether each participant beats a time on a given track. Thus, if the time is set to five minutes, those who finish the race in less than five minutes advance to the next tournament round winners bracket, the remaining participants to the next tournament round losers bracket. Subsequent times and tracks could then be determined based on the position in the topology: for example, WW bracket participants have a more difficult track, or shorter time to beat than those in the WL bracket.

In other embodiments, large 16 or 32 player deathmatch-style games may be played. In these matches, the goal for each participant is to stay alive until the end of the round. Those who are alive at the end of the round advance to the winners' bracket. It is possible in these instances for all of the players to survive. In order to prevent tournaments from continuing indefinitely, tournament creators may wish to limit the total number of rounds in advance. Alternatively, the tournament could be a "play until you drop" marathon tournament. If no one survives the specified period or not enough players survive, the tournament may advance a predetermined number of players who survived the longest.

Figure 18:
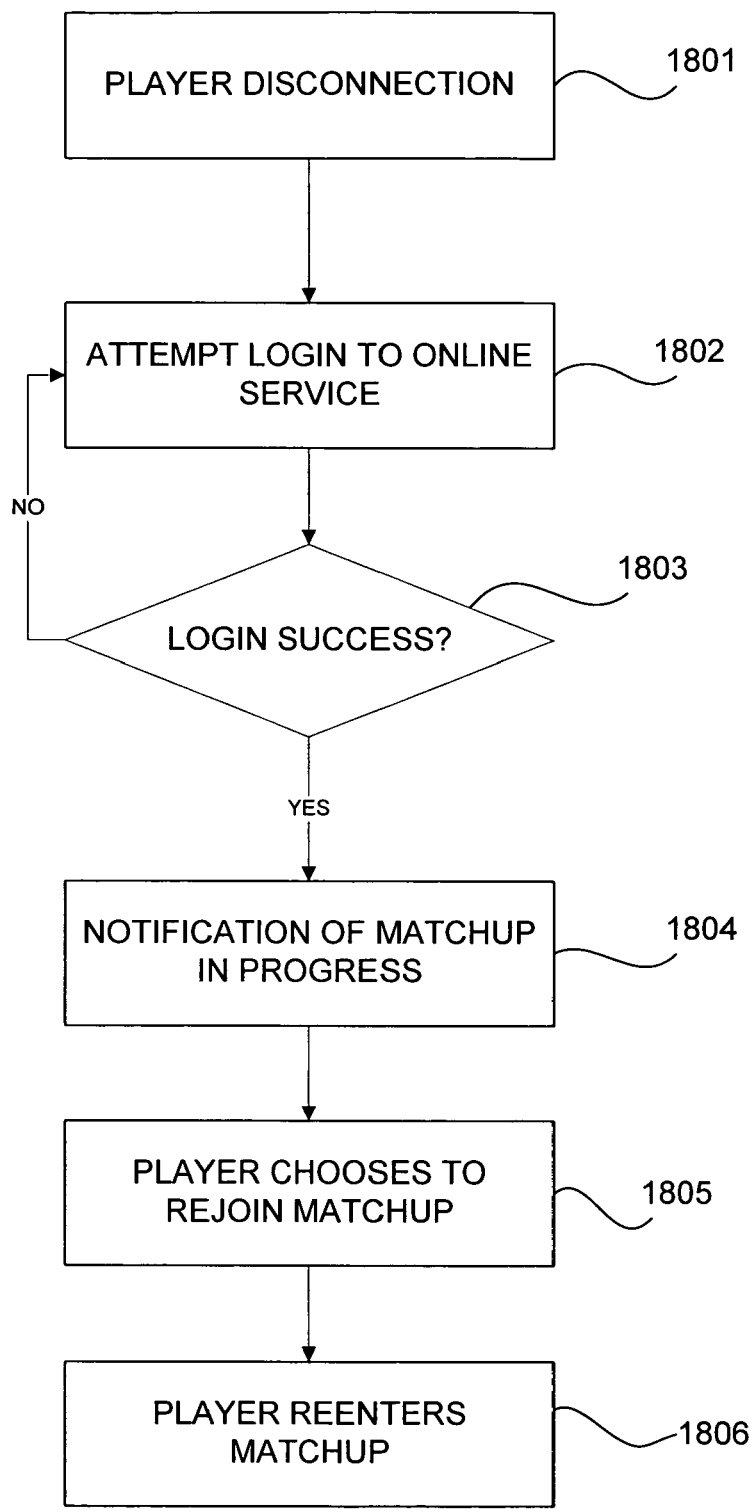
FIG. 18 provides a flowchart that describes the steps that take place when an individual member of a team loses the connection to a match and reconnects to the match.

In yet another aspect of the invention, a connection loss handling mechanism is provided. In a tournament that is configured for team play (as opposed to individual play), a team may lose one or more players mid-game due to QOS/NAT issues. If the connection to the entire team is lost, a match forfeit results. The team may rejoin the tournament, but the match that they were playing is lost and the team advances to the next round losers bracket. The team, however, is permitted to continue playing in a situation where not all players have lost connection. The disconnected individual players may rejoin the game after they reconnect to oniline service 304. FIG. 18 describes the steps that take place when an individual member of a team loses the connection and reconnects to the service.

At 1801, the individual team member loses the connection. Next, at 1802, the individual team member attempts to log back into online services 304. If not successful, the individual team member returns to 1802 where it again attempts to log in. At step 1803, the system determines whether the login is successful. If the login is successful, at 1804 the individual team member is notified that they have a tournament matchup in progress and may rejoin the action. If the player chooses to join the ongoing matchup, they are placed back into the game at 1805. If the player chooses not to rejoin, the tournament ends for them at 1806.

As described above, an online gaming service can provide multilevel online tournaments hosted/endorsed by publishers of game titles, the online gaming service, and/or end-users. The multilevel online tournament format allows participants, regardless of skill level, to participate in multiple tournament rounds, provides individual rankings for all participants (not just the winner), and allows players to progress through rounds without having to wait until a previous round is completed. The inventive method and system are also able to handle tournament scenarios where there are a non-standard number of participants (i.e., other than $2^x$ participants, where x is an integer), participants leave or get disconnected in mid-tournament, and/or tournament participants are unable to connect to each other to play a match. The above described features and safeguards provide a more robust system and result in a higher user satisfaction level than previous known solutions.

The present invention has been described in terms of preferred and exemplary embodiments thereof. Numerous other embodiments, modifications and variations within the scope and spirit of the appended claims will occur to persons of ordinary skill in the art from a review of this disclosure.

We claim:

1. A method for progressing a plurality of participants through an online tournament when the plurality of participants cannot complete a match in a current tournament round, comprising:

determining a number of slots N available in a next round winners bracket;

assigning N participants to the winners bracket according to a trust rating; and assigning remaining participants to a next round losers bracket.

2. A method for administering an online game tournament comprising steps of:

(a) initially placing a group of participants in a single bracket of a first tournament round, wherein a size of the group of participants requires at least three complete tournament rounds to determine a winner;

(b) pairing off the participants in each bracket of a current tournament round for game match-ups, each of which result in a winner and a loser, wherein any two participants in a same bracket of the tournament round are allowed to match-up;

(c) for each match-up, advancing the winner into a next tournament round winners bracket corresponding to the bracket for the current round in which the match-up occurred, and advancing the loser into a next tournament round losers bracket corresponding to the bracket for the current round in which the match-up occurred; and (d) repeating steps (b) and (c) until each current tournament round bracket has only one participant.

3. The method of claim 2, wherein a match-up in a subsequent tournament round may occur and begin play before a previous tournament round has been completed.

4. A computer-implemented method for administering a game tournament over a computer network, comprising steps of:

(a) initially placing a group of participants in a single bracket of a first tournament round, wherein a size of the group of participants requires at least three complete tournament rounds to determine a winner;

(b) grouping the participants in each bracket of a current tournament round for game match-ups, each of which result in one or more winners and one or more losers, wherein any two or more participants in a same bracket of the tournament round are allowed to match-up;

(c) for each match-up, placing the winner into a next tournament round winners bracket corresponding to the bracket for the current round in which the match-up occurred, and placing the loser into a next tournament round losers bracket corresponding to the bracket for the current round in which the match-up occurred; and (d) repeating steps (b) and (c) until each current tournament round bracket has only one participant.

5. The method of claim 4, wherein pairing off can occur as soon as two participants are advanced into the same bracket.

6. The method of claim 4, wherein when there are a non-standard number of participants in the tournament, granting a bye to the next tournament round to any unmatched-up participant.

7. The method of claim 4, wherein when a specific participant's opponent leaves the tournament, progressing the specific participant to the next tournament round winners bracket corresponding to the bracket for the current round in which the match-up was to have taken place.

8. The method of claim 4, wherein when a participant cannot be matched up to another participant due to quality of service or network address translation errors, progressing the unmatched participants to either the next tournament round winners bracket or the next tournament round losers bracket corresponding to the bracket for the current round in which the match-up was to have taken place.

9. The method of claim 8, wherein the progression into the next tournament round winners bracket or the next tournament round losers bracket is determined based on a trust level of each progressed participant.

10. The method of claim 8, wherein progression into the next tournament round winners bracket or the next tournament round losers bracket comprises:
   determining a number of slots N available in a next round winners bracket;
   assigning N participants to the winners bracket based on each participants' trust rating; and
   assigning remaining participants to a next round losers bracket.

11. The method of claim 4, further comprising establishing a round recurrence interval (RRI) which specifies a maximum amount of time for each tournament round.

12. The method of claim 11, wherein the RRI is an approximate amount of time it takes to complete a tournament match.

13. The method of claim 4, further comprising establishing an auto-progression deadline (APD) which specifies a time within each round by which each participant must either begin a match, request a bye, or request progression to the next round.

14. The method of claim 13, wherein if the APD is not met by a participant, that participant is eliminated from the tournament.

15. A method for administering an online game tournament comprising steps of:
   (a) initially placing a group of participants in a single bracket of a first tournament round, wherein a size of the group of participants requires at least three complete tournament rounds to determine a winner;
   (b) allowing the group of participants each to play a game against a score or a deadline, the result of the game being measured by a score or time value;
   (c) upon completion of the games advancing participants based on the score or time value into a next tournament round winners bracket corresponding to the bracket for the current round in which the match-up occurred, and advancing the loser into a next tournament round losers bracket corresponding to the bracket for the current round in which the match-up occurred, and
   (d) repeating steps (b) and (c) until each current tournament round bracket has only one participant.

* * * * *